US011720300B2

(12) United States Patent
Yamamoto et al.

(10) Patent No.: US 11,720,300 B2
(45) Date of Patent: Aug. 8, 2023

(54) COMMUNICATING INFORMATION CONCERNING PRINTING TARGET DATA VIA A MESSAGING SCREEN THAT IS DIFFERENT FROM A SETTING SCREEN FOR COMMUNICATING PRINTING SETTING INFORMATION

(71) Applicant: CANON KABUSHIKI KAISHA, Tokyo (JP)

(72) Inventors: Hiroyuki Yamamoto, Kawasaki (JP); Asuka Kanno, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/202,856

(22) Filed: Mar. 16, 2021

(65) Prior Publication Data

US 2021/0208824 A1 Jul. 8, 2021

Related U.S. Application Data

(63) Continuation of application No. 16/269,665, filed on Feb. 7, 2019, now Pat. No. 10,970,010.

(30) Foreign Application Priority Data

Feb. 16, 2018 (JP) .................................. 2018-026403
Feb. 16, 2018 (JP) .................................. 2018-026404

(51) Int. Cl.
*G06F 3/12* (2006.01)

(52) U.S. Cl.
CPC .......... *G06F 3/1222* (2013.01); *G06F 3/1238* (2013.01); *G06F 3/1288* (2013.01)

(58) Field of Classification Search
None
See application file for complete search history.

(56) References Cited

U.S. PATENT DOCUMENTS 9,876,654 B2   1/2018 Lee et al.
2005/0162685 A1   7/2005 Heiles et al.
(Continued)

FOREIGN PATENT DOCUMENTS

JP   2004-213251 A   7/2004
JP   2005-216309 A   8/2005
(Continued)

OTHER PUBLICATIONS

Japanese Office Action dated Jan. 7, 2022 in counterpart Japanese Patent Application No. 2018-026404.
(Continued)

*Primary Examiner* — Thomas D Lee
(74) *Attorney, Agent, or Firm* — Venable LLP

(57) ABSTRACT

The first server issues, in response to an issuance request, identification information that corresponds to a printing apparatus and is used for registration processing to use the printing apparatus from a messaging application, and manages first information of the printing apparatus and the identification information, and the second server manages the first information of the printing apparatus and second information of the messaging application and registers the second information of the messaging application so that the printing apparatus corresponding to the identification information from the messaging application can be used if the identification information is determined to be valid by referring to information managed by the first server when the identification information is input via the messaging application, wherein the first server issues, for one printing apparatus, a different piece of identification information for each issuance request.

48 Claims, 30 Drawing Sheets

(56) References Cited

U.S. PATENT DOCUMENTS

| | | |
|---|---|---|
| 2005/0179944 A1 | 8/2005 | Gassho et al. |
| 2012/0079081 A1 | 3/2012 | Parks et al. |
| 2018/0181352 A1 | 6/2018 | Saito |
| 2018/0240179 A1 | 8/2018 | Yamamoto |

FOREIGN PATENT DOCUMENTS

| | | | | |
|---|---|---|---|---|
| JP | 2009043240 A | * | 2/2009 | ........... G06F 3/1205 |
| JP | 2012252699 A | | 12/2012 | |
| JP | 2013-146915 A | | 8/2013 | |
| JP | 2014026562 A | | 2/2014 | |
| JP | 2015-138392 A | | 7/2015 | |
| JP | 2016062482 A | * | 4/2016 | |
| JP | 2018-010336 A | | 1/2018 | |

OTHER PUBLICATIONS

Japanese Office Action dated Jan. 14, 2022 in counterpart Japanese Patent Application No. 2018-026403.
Japanese Office Action issued in corresponding Japanese Application No. 2022-165016 dated May 26, 2023.

* cited by examiner

| CONNECT ID | PRINTER ID | PRINTER TYPE | EXPIRATION DATE |
|---|---|---|---|
| amskri6ej | 05001 | P0001 | 2017/12/21 10:00 |
| krnbt58hr | 01052 | P0002 | 2017/12/21 10:02 |
| 2sefjr6sd | 35126 | P0001 | 2017/12/21 10:25 |
| r52wud6rz | 03679 | P0052 | 2017/12/21 10:26 |
| abdbdc612 | 05001 | P0001 | 2017/12/22 11:25 |

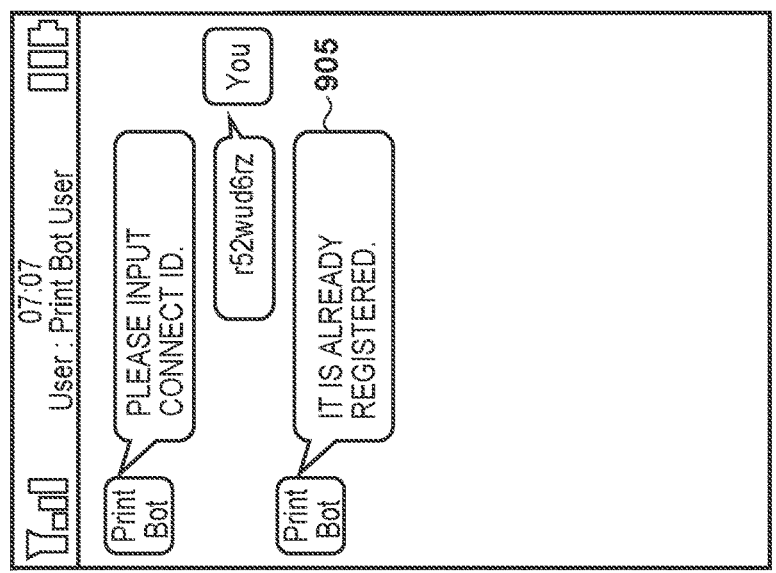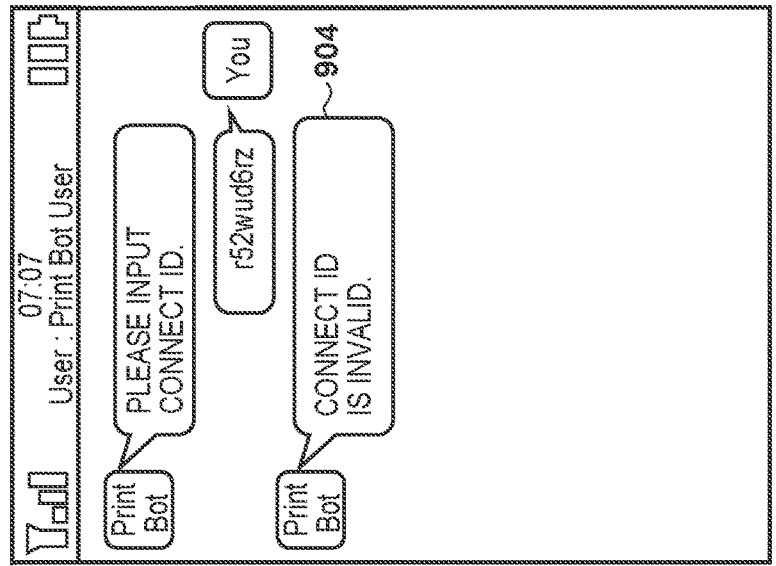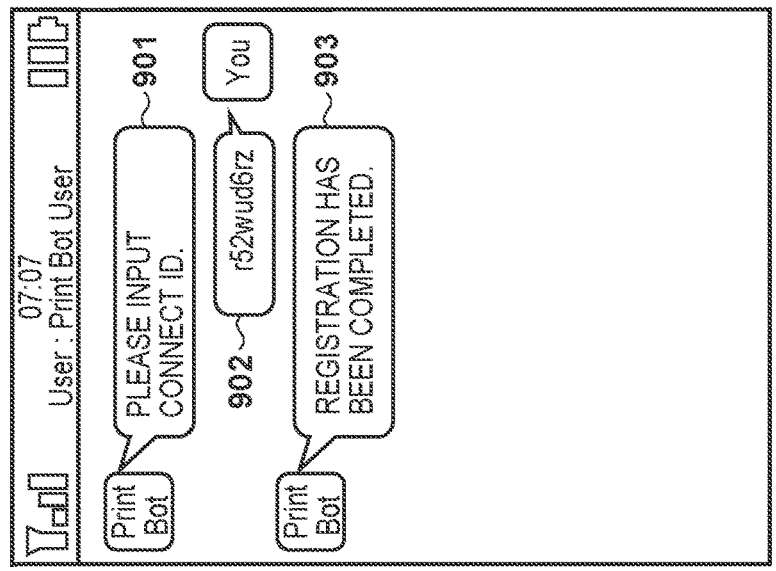

FIG. 10A

| CLIENT APPLICATION IDENTIFICATION INFORMATION | PRINTER ID | DEVICE NAME |
|---|---|---|
| C0001 | 03679 | P0002 |
| C0673 | 35126 | P0001 |
| | | |

FIG. 10B

| APPLICATION ID | PRINTER ID |
|---|---|
| Bot0001 | 03679 |
| Bot0001 | 35126 |
| | |
| | |

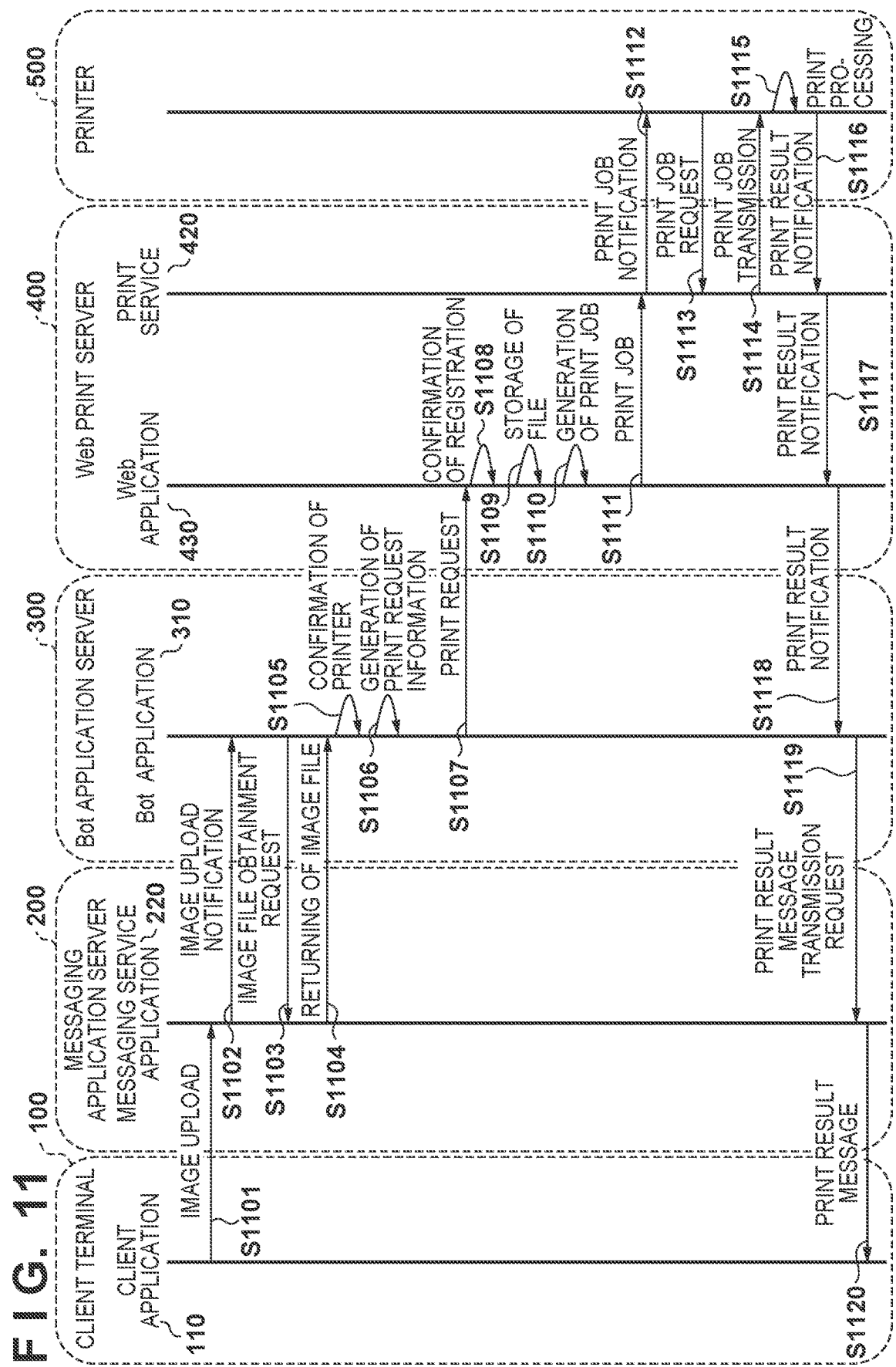

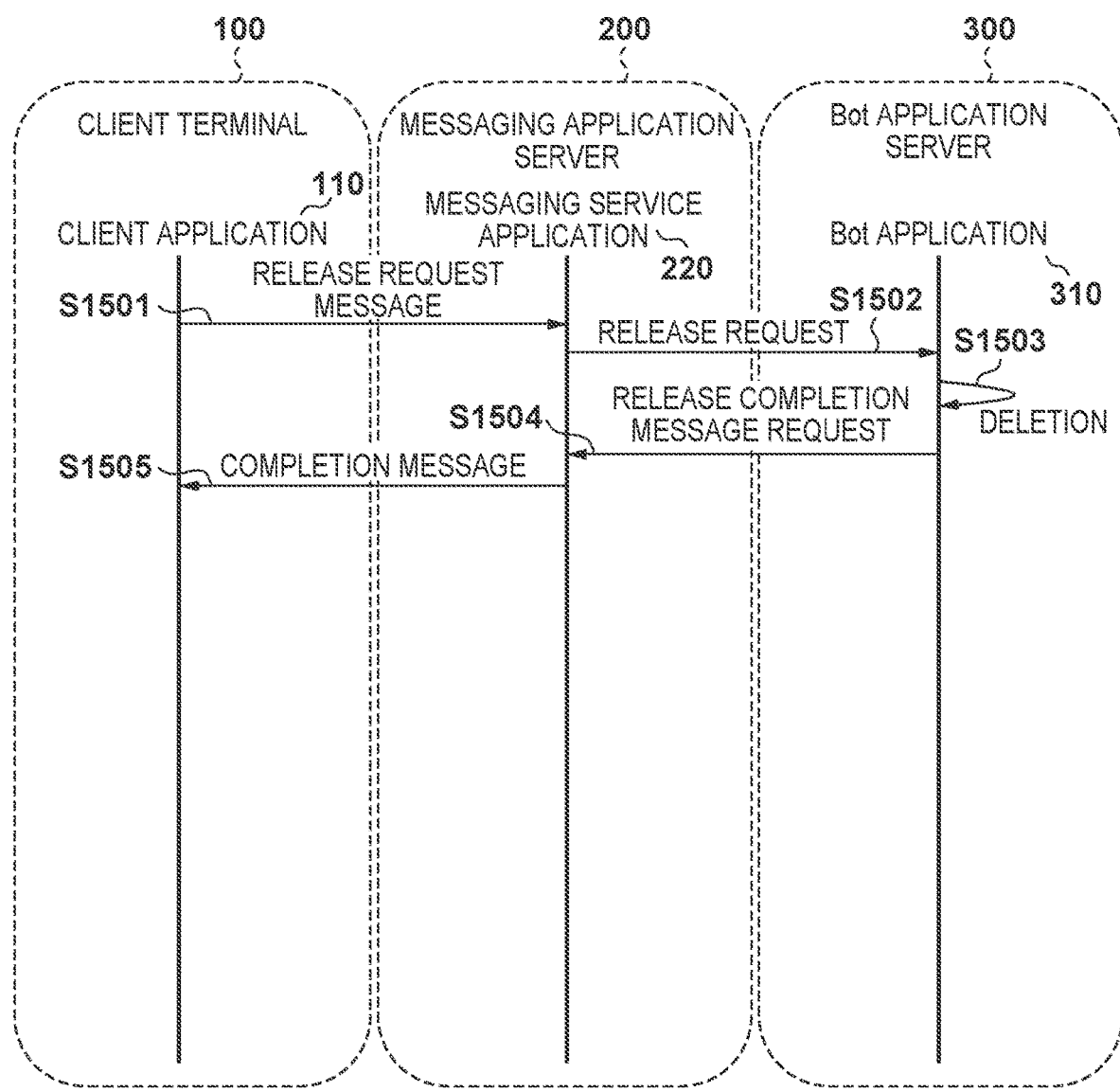

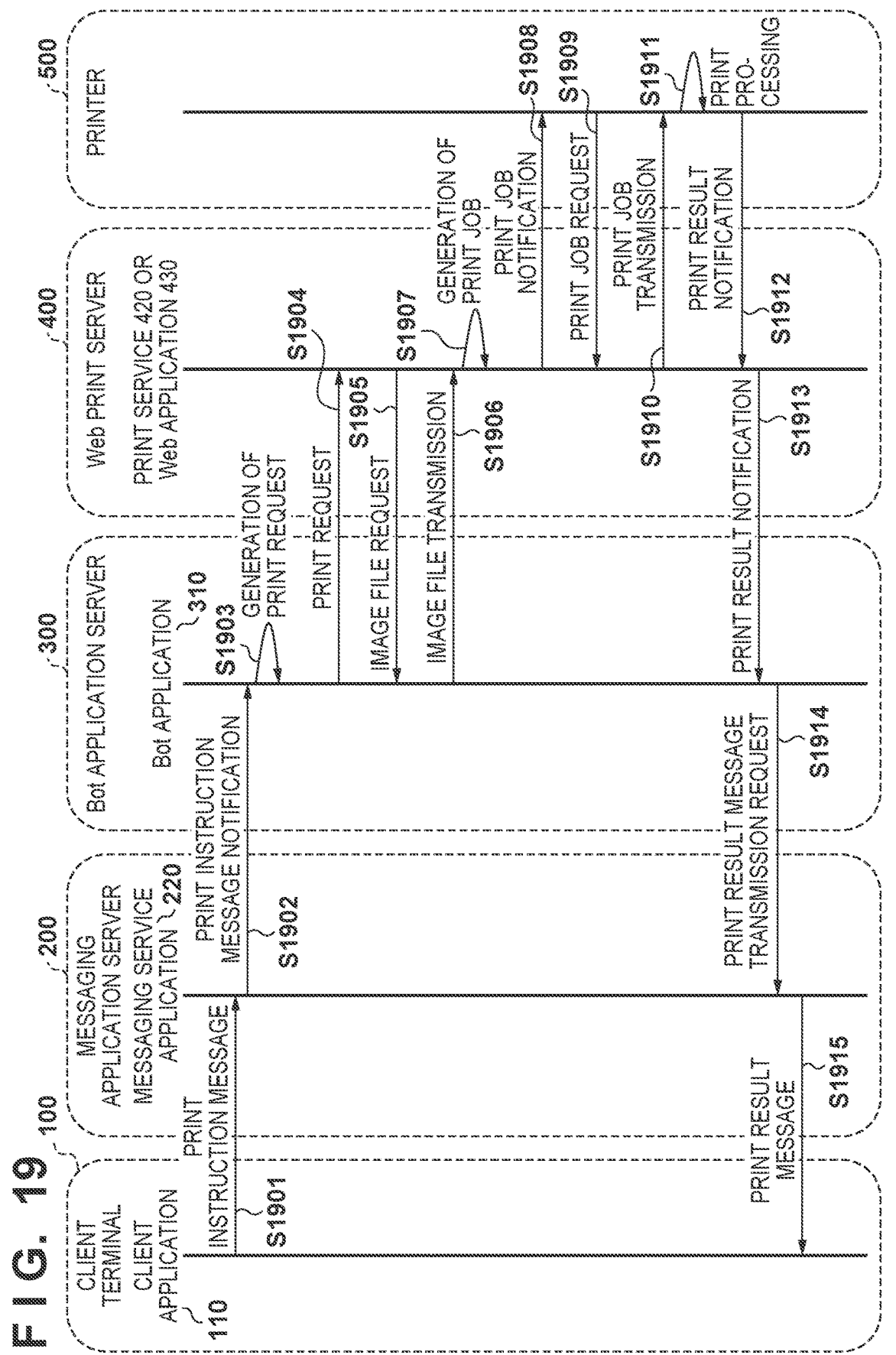

F I G. 20A

TABLE T2010

| USER ID | PRINTER ID | SHEET SIZE | SHEET TYPE | LAYOUT | COLOR MODE |
|---|---|---|---|---|---|
| U000001 | P48927341 | 4×6 | PHOTO PAPER | WITH BORDER | COLOR |
| U000002 | P49238743 | A4 | MATTE PAPER | WITH BORDER | GRAY |
| U000003 | P12398798 | B5 | GLOSSY PHOTO PAPER | WITHOUT BORDER | COLOR |

F I G. 20B

TABLE T2020

| USER ID | PRINT REQUEST ID | SHEET SIZE | SHEET TYPE | LAYOUT | COLOR MODE | EXPIRATION DATE | FILE URL | PRINT SETTING Web PAGE URL |
|---|---|---|---|---|---|---|---|---|
| U000001 | J-111111 | 4×6 | PHOTO PAPER | WITH BORDER | COLOR | 2017/12/17 10:00 | https://botserver.com/storage/11000/... | https://botserver.com/setting/000001/... |
| U000001 | J-111112 | 4×6 | MATTE PAPER | WITH BORDER | GRAY | 2017/12/24 05:30 | https://botserver.com/storage/12000/... | https://botserver.com/setting/000002/... |
| U000001 | J-111113 | POSTCARD | INKJET POSTCARD | WITHOUT BORDER | COLOR | 2017/12/28 22:09 | https://botserver.com/storage/13000/... | https://botserver.com/setting/000003/... |
| U000002 | J-222221 | A4 | PHOTO PAPER | WITH BORDER | COLOR | 2017/12/14 20:11 | https://botserver.com/storage/21000/... | https://botserver.com/setting/000004/... |
| U000002 | J-222222 | A4 | PHOTO PAPER | WITH BORDER | COLOR | 2017/12/14 20:15 | https://botserver.com/storage/22000/... | https://botserver.com/setting/000005/... |

F I G. 25A

TABLE T2510

| USER ID | PRINTER ID | SHEET SIZE | SHEET TYPE | LAYOUT | COLOR MODE |
|---|---|---|---|---|---|
| U000001 | P4892734 1 | 4×6 | PHOTO PAPER | WITH BORDER | COLOR |

F I G. 25B

TABLE T2520

| USER ID | PRINT REQUEST ID | SHEET SIZE | SHEET TYPE | LAYOUT | COLOR MODE | EXPIRATION DATE | FILE URL | PRINT SETTING Web PAGE URL |
|---|---|---|---|---|---|---|---|---|
| U000001 | J-1302 | POSTCARD | INKJET POSTCARD | WITH BORDER | COLOR | 2017/12/17 10:00 | https://botserver.com/storage/11000/... | https://botserver.com/setting/000001/... |
| U000001 | J-1305 | 4×6 | PHOTO PAPER | WITH BORDER | COLOR | 2017/12/24 05:30 | https://botserver.com/storage/12000/... | https://botserver.com/setting/000002/... |

FIG. 26A

PRINT SETTINGS

| SHEET SIZE | 4×6 ▽ |
| SHEET TYPE | PHOTO PAPER ▽ |
| LAYOUT | WITH BORDER ▽ |
| NUMBER OF COPIES | 1 ▽ |
| COLOR MODE | COLOR ▽ |

[×] APPLY THESE SETTINGS FROM THE NEXT OPERATION ~1505

- STORE PRINT SETTINGS ~2602
- MAKE FINE ADJUSTMENTS ON THE IMAGE ~2603
- CANCEL ~2604

PRINT SETTINGS

| SHEET SIZE | POSTCARD ▽ |
| SHEET TYPE | INKJET POSTCARD ▽ |
| LAYOUT | WITH BORDER ▽ |
| NUMBER OF COPIES | 1 ▽ |
| COLOR MODE | COLOR ▽ |

[×] APPLY THESE SETTINGS FROM THE NEXT OPERATION ~1505

- STORE PRINT SETTINGS ~2602
- MAKE FINE ADJUSTMENTS ON THE IMAGE ~2603
- CANCEL ~2604

{2601}
2600

F I G. 27A

TABLE T2710

| USER ID | PRINTER ID | SHEET SIZE | SHEET TYPE | LAYOUT | COLOR MODE |
|---|---|---|---|---|---|
| U000001 | P48927341 | 4×6 | PHOTO PAPER | WITH BORDER | COLOR |

F I G. 27B

TABLE T2720

| USER ID | PRINT REQUEST ID | SHEET SIZE | SHEET TYPE | LAYOUT | COLOR MODE | EXPIRATION DATE | FILE URL | PRINT SETTING Web PAGE URL |
|---|---|---|---|---|---|---|---|---|
| U000001 | J-1301 | B5 | PHOTO PAPER | WITHOUT BORDER | COLOR | 2017/12/15 22:00 | https://botserver.com/storage/11000/... | https://botserver.com/setting/000001/... |
| U000001 | J-1302 | 4×6 | PHOTO PAPER | WITH BORDER | COLOR | 2017/12/17 10:00 | https://botserver.com/storage/11000/... | https://botserver.com/setting/000001/... |

F I G. 27C
TABLE T2730

| USER ID | PRINTER ID | SHEET SIZE | SHEET TYPE | LAYOUT | COLOR MODE |
|---|---|---|---|---|---|
| U000001 | P48927341 | POSTCARD | INKJET POSTCARD | WITH BORDER | COLOR |

F I G. 27D
TABLE T2740

| USER ID | PRINT REQUEST ID | SHEET SIZE | SHEET TYPE | LAYOUT | COLOR MODE | EXPIRATION DATE | FILE URL | PRINT SETTING Web PAGE URL |
|---|---|---|---|---|---|---|---|---|
| U000001 | J-1301 | B5 | PHOTO PAPER | WITHOUT BORDER | COLOR | 2017/12/15 22:00 | https://botserver.com/storage/11000/... | https://botserver.com/setting/000001/... |
| U000001 | J-1302 | POSTCARD | INKJET POSTCARD | WITH BORDER | COLOR | 2017/12/17 10:00 | https://botserver.com/storage/11000/... | https://botserver.com/setting/000001/... |
| U000001 | J-1303 | POSTCARD | INKJET POSTCARD | WITH BORDER | COLOR | 2017/12/17 11:00 | https://botserver.com/storage/11000/... | https://botserver.com/setting/000001/... |

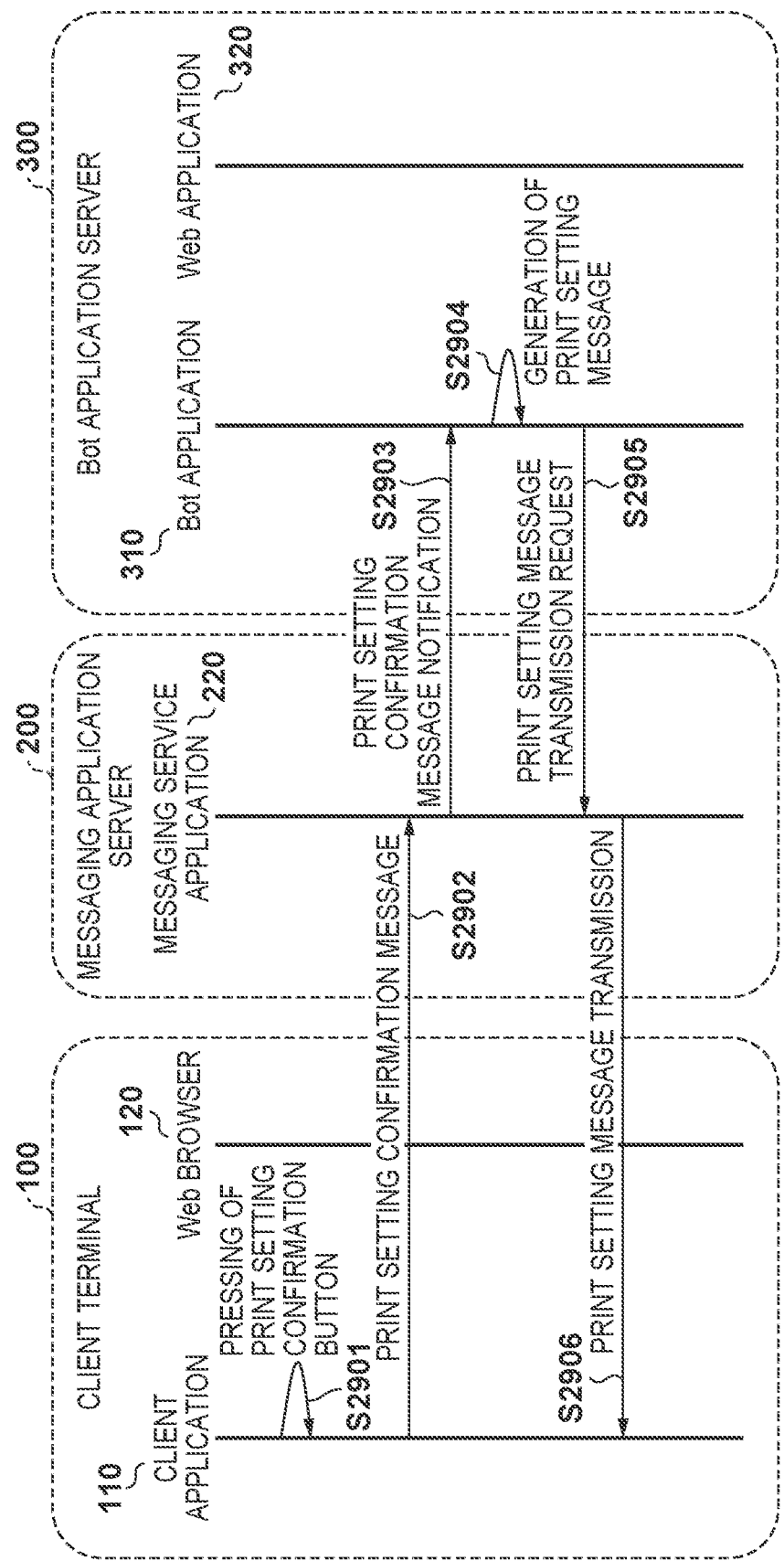

COMMUNICATING INFORMATION CONCERNING PRINTING TARGET DATA VIA A MESSAGING SCREEN THAT IS DIFFERENT FROM A SETTING SCREEN FOR COMMUNICATING PRINTING SETTING INFORMATION

CROSS-REFERENCE TO RELATED APPLICATIONS

This application is a Continuation of U.S. patent application Ser. No. 16/269,665, filed Feb. 7, 2019, which claims the benefit of Japanese Patent Application No. 2018-026403, filed Feb. 16, 2018, and Japanese Patent Application No. 2018-026404, Filed Feb. 16, 2018, the entire disclosures of which are all hereby incorporated by reference herein.

BACKGROUND OF THE INVENTION

Field of the Invention

The present invention relates to a system, an information processing apparatus, a control method thereof, and a non-transitory computer-readable storage medium.

Description of the Related Art

The use of a messaging application for so-called chatting in which messages are exchanged between a plurality of user terminals via a network has become popular (see Japanese Patent Laid-Open No. 2012-252699). In recent years, in such a messaging application, services using a bot application that automatically transmits a response in accordance with the contents of a message transmitted by a user via the messaging application have increased. On the other hand, together with the popularization of cloud services, a printing device also has a network communication function, and there is a cloud print service (Web print service) that allows a user to make a print instruction from a terminal via a network.

When a cloud print service and a bot application as those described above cooperate, the user can make print instructions to a printing device in a dialog format with the bot application from a messaging application on a terminal. In a cloud print service that uses such a messaging application, the user will transmit a print target image file to a virtual user to which the bot application responds on the messaging application. Furthermore, by inputting the print setting information in a dialog format, it becomes possible to instruct the printing device to print the image file received by the bot application based on the designated print settings.

However, Japanese Patent Laid-Open No. 2012-252699 does not disclose processing to perform printing by using a messaging application.

In addition, a messaging application can store each message exchanged between a user and a bot application. Hence, there is a demand to be able to reprint an image file that has been already transmitted and printed by a user in a simple manner.

SUMMARY OF THE INVENTION

The present invention provides a unit to implement printing via a messaging application.

According to one aspect of the present invention, there is provided a system formed by including a client terminal that includes a messaging application, a first server configured to control print processing of a printing apparatus, and a second server configured to operate in cooperation with the messaging application, the first server including an issuing unit configured to issue, in response to an issuance request, identification information that corresponds to the printing apparatus and is used for registration processing to use the printing apparatus from the messaging application, and a first management unit configured to manage first information of the printing apparatus and the identification information issued by the issuing unit in association with each other, and the second server including a second management unit configured to manage the first information of the printing apparatus and second information of the messaging application, and a registration unit configured to register the second information of the messaging application in the second management unit so that the printing apparatus corresponding to the identification information from the messaging application can be used if the identification information is determined to be valid by referring to information managed by the first management unit when the identification information is input via the messaging application, wherein the issuing unit issues, for one printing apparatus, a different piece of identification information for each issuance request.

According to another aspect of the present invention, there is provided an information processing apparatus that controls print processing performed by a printing apparatus in accordance with a print request from a messaging application included in a client terminal, comprising: an issuing unit configured to issue, in response to an issuance request, identification information that corresponds to the printing apparatus and is used for registration processing to use the printing apparatus from the messaging application; and a management unit configured to manage information of the printing apparatus and the identification information issued by the issuing unit in association with each other, wherein the issuing unit issues, for one printing apparatus, a different piece of identification information for each issuance request.

According to another aspect of the present invention, there is provided a control method of an information processing apparatus that controls print processing performed by a printing apparatus in accordance with a print request from a messaging application included in a client terminal, the method comprising: issuing, in response to an issuance request, identification information that corresponds to the printing apparatus and is used for registration processing to use the printing apparatus from the messaging application; managing information of the printing apparatus and the issued identification information in association with each other in a storage unit; and a different piece of identification information for each issuance request is issued for one printing apparatus.

According to another aspect of the present invention, there is provided a non-transitory computer-readable medium storing a program to cause a computer to function as an issuing unit configured to issue, in response to an issuance request, identification information that corresponds to a printing apparatus and is used for registration processing to use the printing apparatus from a messaging application included in a client terminal; and a management unit configured to manage information of the printing apparatus and the identification information issued by the issuing unit in association with each other, wherein the issuing unit issues, for one printing apparatus, a different piece of identification information for each issuance request.

According to the present invention, highly convenient printing via a messaging application can be implemented.

Further features of the present invention will become apparent from the following description of exemplary embodiments (with reference to the attached drawings).

BRIEF DESCRIPTION OF THE DRAWINGS

FIG. 6 is a view showing a connect-ID management table according to the present invention;

FIGS. 9A to 9C are views each showing an example of a registration processing screen according to the present invention;

FIGS. 10A and 10B are views of registered printer management tables according to the present invention;

FIG. 11 is a sequence chart showing print processing according to the present invention;

FIG. 15 is a sequence chart of the registration release processing;

FIG. 19 is a sequence chart of print job execution processing according to the second embodiment;

FIGS. 20A and 20B are views of tables showing information managed in a database according to the second embodiment;

FIGS. 25A and 25B are views of tables showing information managed by a database according to the second embodiment;

FIGS. 26A and 26B are views each showing an example of a print setting Web page which is displayed by a Web browser according to the third embodiment;

FIGS. 27A to 27D are views of tables showing information managed by a database according to the third embodiment;

FIG. 29 is a sequence chart showing processing according to the fourth embodiment.

DESCRIPTION OF THE EMBODIMENTS

Preferred embodiments of the present invention will be described hereinafter with reference to the accompanying drawings. Note that the following embodiments do not limit the scope of the appended claims, and not all combinations of features described in the embodiments are essential to the solving means of the present invention.

First Embodiment

An example of a Web service in which a Web print service and a bot application of a messaging application cooperate to instruct a printing device, via a network, to print an image file that has been transmitted from a messaging application by a user will be described as an embodiment of the present invention.

[System Arrangement]

The configuration of each server and apparatuses in a system according to the embodiment will be described first.

Figure 1:
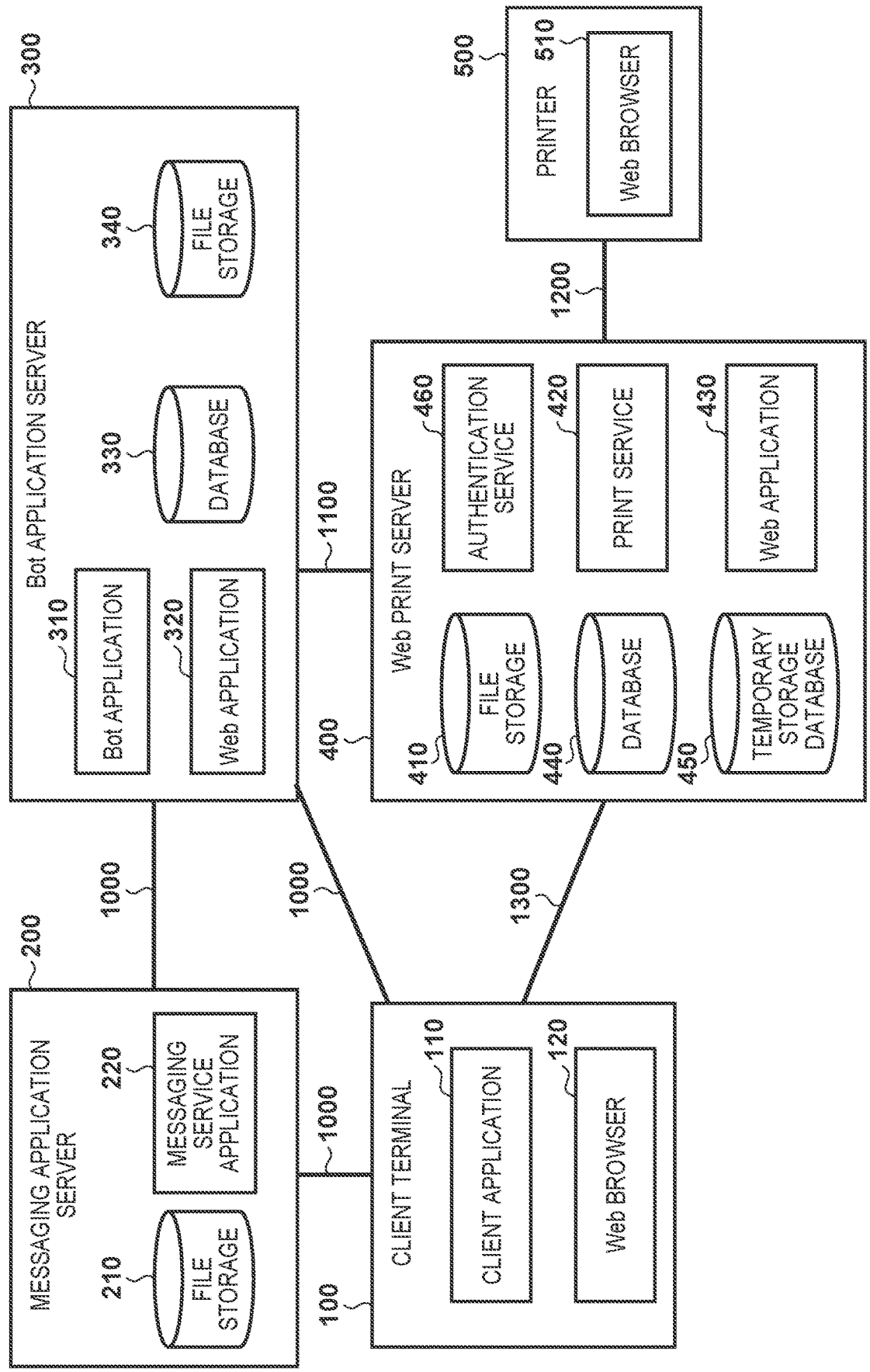
FIG. 1 is a block diagram showing an example of the configuration of a Web printing system according to the first embodiment.

FIG. 1 is a block diagram showing an example of the configuration of a client server network system according to this embodiment. The network system according to the embodiment includes a client terminal 100, a messaging application server 200, a bot application server 300, a Web print server 400, and a printer 500. In FIG. 1, the client terminal 100, the messaging application server 200, and the bot application server 300 are communicably connected to each other via a network 1000.

The bot application server 300 and the Web print server 400 are communicably connected to each other via a network 1100. The client terminal 100 and the Web print server 400 are communicably connected to each other via a network 1300. The Web print server 400 and the printer 500 are communicably connected to each other via a network 1200. Note that the number of the client terminals 100 and that of the printers 500 are not limited to those shown in FIG. 1, and there may be a plurality of these devices. In addition, each server may be formed by a plurality of servers for load distribution.

The networks 1000, 1100, 1200, and 1300 may be one of, for example, the Internet such as a LAN, a WAN, a telephone line, a dedicated digital line, an ATM, a frame relay line, a cable TV line, a wireless line for digital broadcasting, and the like. In addition, the networks suffice to be a so-called communication network that is implemented by a combination of these networks and is capable of data transmission/reception, and the networks may be wired or wireless. Furthermore, the networks 1000, 1100, 1200, and 1300 may be formed by different networks or may have an arrangement that uses the same network.

The client terminal 100 is, for example, a PC (personal computer), a smartphone, a tablet terminal or the like, and is operated by a user. The client terminal 100 includes a client application 110 and a Web browser 120. The client application 110 transmits a message including a character string, an image file (image data), and the like input by a user operation to a messaging service application 220 of the messaging application server 200 via the network 1000. The client application 110 also notifies the user of a message received from the messaging service application 220 via the network 1000.

The Web browser 120 is an application used to display a Web page. The Web browser 120 displays a Web page that is provided by a Web application 430 included in the Web print server 400 via the network 1300. The Web browser 120 also accepts an operation from the user who uses the client terminal 100. Note that Web pages displayed by the Web browser 120 are not limited to those provided by the Web application 430 of the Web print server 400. In addition, HTML (Hypertext Markup Language) and the like may be used as the description language of each Web page, and the description language is not particularly limited.

The messaging application server 200 includes a file storage 210 and the messaging service application 220. The file storage 210 stores each image file transmitted from the client application 110 of the client terminal 100. The messaging service application 220 receives each message and each image file transmitted from the client application 110 of the client terminal 100. The messaging service application 220 transmits a message reception event to a bot application 310 of the bot application server 300 via the network 1000 and stores received image files in the file storage 210. The messaging service application 220 also transmits a message to the client application 110 based on a request from the bot application 310. The messaging service application 220 returns the image file stored in the file storage 210 to the bot application 310. Although it is not shown in FIG. 1, note that the messaging application server 200 performs processing such as message relay processing and the like in a case in which messages are to be exchanged between a plurality of client terminals.

The bot application server 300 includes the bot application 310, the Web application 320, a database 330, and a file storage 340. The bot application 310 receives an event notification from the messaging service application 220 of the messaging application server 200 and executes processing corresponding to the contents of the received event. The bot application 310 also transmits a message transmission request to the messaging service application 220 via the network 1000 as needed. The bot application 310 functions as a virtual user of the messaging service application 220 and is capable of exchanged messages with the client application 110 of the client terminal 100.

The Web application 320 provides various functions and Web pages corresponding to the functions. The database 330 stores proprietary printer information of each user and the like. The file storage 340 stores each image file to be printed by the printer 500.

The Web print server 400 provides a print service. The print service in this case is a service that transmits a print/scan instruction received from the outside to a registered printer (for example, the printer 500) via the network 1200 and causes the registered printer to execute the print/scan instruction. The Web print server 400 includes a file storage 410, a print service 420, the Web application 430, a database 440, a temporary storage database 450, and an authentication service 460.

The authentication service 460 is a service that performs access source authentication by using registered account information when it accepts access from the client terminal 100 or the printer 500. The print service 420 can be used only when the authentication by the authentication service 460 has succeeded. The account information described here includes at least a user ID and a password. In addition, assume that the user of the client application 110 has registered the information of the held (usable) printer 500 in advance. Although the embodiment will describe a case in which there is one printer held by the user, a plurality of printers may be held.

The database 440 stores account information already registered in the print service, information related to the printer held in an account, and information of an application which is to use the print service. Although the bot application server 300 is set as the only application which is to use the print service in this embodiment, the present invention is not limited to this, and a plurality of applications may be set. The print service 420 receives a print request from the bot application 310 of the bot application server 300, generates a print job, and notifies the printer 500 of the print job. The file storage 410 stores print job data that has been converted into a format processable by the printer 500.

The Web application 430 has a function of issuing and displaying a connect ID based on a user operation by providing a Web page to the Web browser 120 of the client terminal 100 or a Web browser 510 of the printer 500. In addition, the Web application 430 has a function of verifying whether the connect ID is valid by receiving the connect ID input by the user by using the client application 110 via the network. The connect ID will be described in detail later. The temporary storage database 450 is a database for the Web application 430 to temporarily store the issued registration codes and the like.

The printer 500 includes the Web browser 510. The printer 500 receives a print job notification from the print service 420 of the Web print server 400. In addition, the printer 500 executes printing by obtaining a print job from the file storage 410 of the Web print server 400. The Web browser 510 is an application for displaying a Web page. The Web browser 510 displays the Web page, provided by the Web application 320 of the bot application server 300, and accepts the operation from the user of the client terminal 100.

Figure 2:
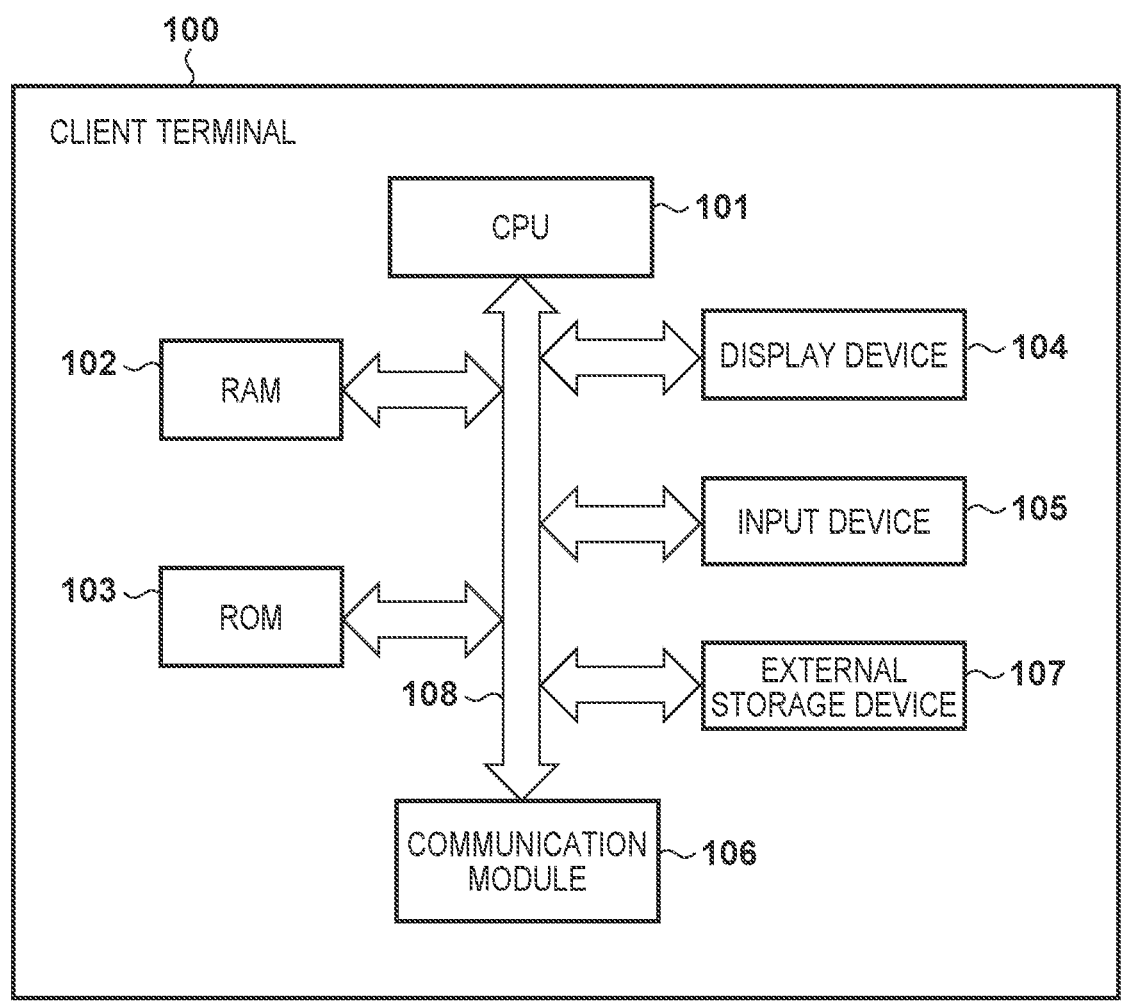
FIG. 2 is a block diagram showing an example of the arrangement of a client terminal according to the present invention.

FIG. 2 is a block diagram showing an example of the hardware arrangement of the client terminal 100 according to this embodiment. The client terminal 100 includes a CPU 101, a RAM 102, a ROM 103, a display device 104, an input device 105, a communication module 106, and an external storage device 107.

The CPU 101 calculates, determines, and controls data and instructions in accordance with programs stored in the RAM 102 and the ROM 103. The RAM 102 is a volatile storage area and is used as a temporary storage area by the CPU 101 to perform various kinds of processing. The ROM 103 is a nonvolatile storage area and stores an operating system (OS), the client application 110, the Web browser 120, and other application software. The display device 104 is formed by a liquid crystal display and a graphic controller, and displays a Web page downloaded from each server, a graphical user interface (GUI), and the like. Web page display is performed by the Web browser 120 downloading a Web page to the RAM 102 and displaying the downloaded Web page on the display device 104.

The input device 105 is a device operated by the user to provide various kinds of instructions to the client terminal 100 such as, for example, a keyboard. The input device 105 is also a device for obtaining an image such as, for example, a camera. Note that the input device 105 is not limited to these devices, and may be an external part. The client terminal 100 receives the various instructions made by the user via the input device 105 and performs various kinds of control corresponding to the instructions.

The communication module 106 is an interface for communicating with an external apparatus connected, for example, via a LAN cable or a telephone line. The communication module 106 connects to a communication device (not shown) such as a router and performs data communication with the messaging application server 200 and the bot application server 300 via the network 1000. Note that the data communication may be performed wirelessly by, for example, an interface supporting wireless communication. The external storage device 107 is a nonvolatile storage area. For example, if the client terminal 100 is a smartphone, a flash memory will be used generally as the external storage device 107. A system bus 108 exchanges the data between the respective components included in the client terminal 100.

In FIG. 2, the display device 104 and the input device 105 are shown separately in the client terminal 100. However, the present invention is not limited to this, and a touch panel display or the like integrating the display device and the input device may be used. In this case, the camera which is the image capturing device will be arranged separately from the touch panel display. In addition, although one client terminal 100 is shown in FIG. 1, the messaging application according to the embodiment can exchange messages between a plurality of client terminals. In this case, the plurality of client terminals may have different hardware arrangements from each other.

Figure 3:
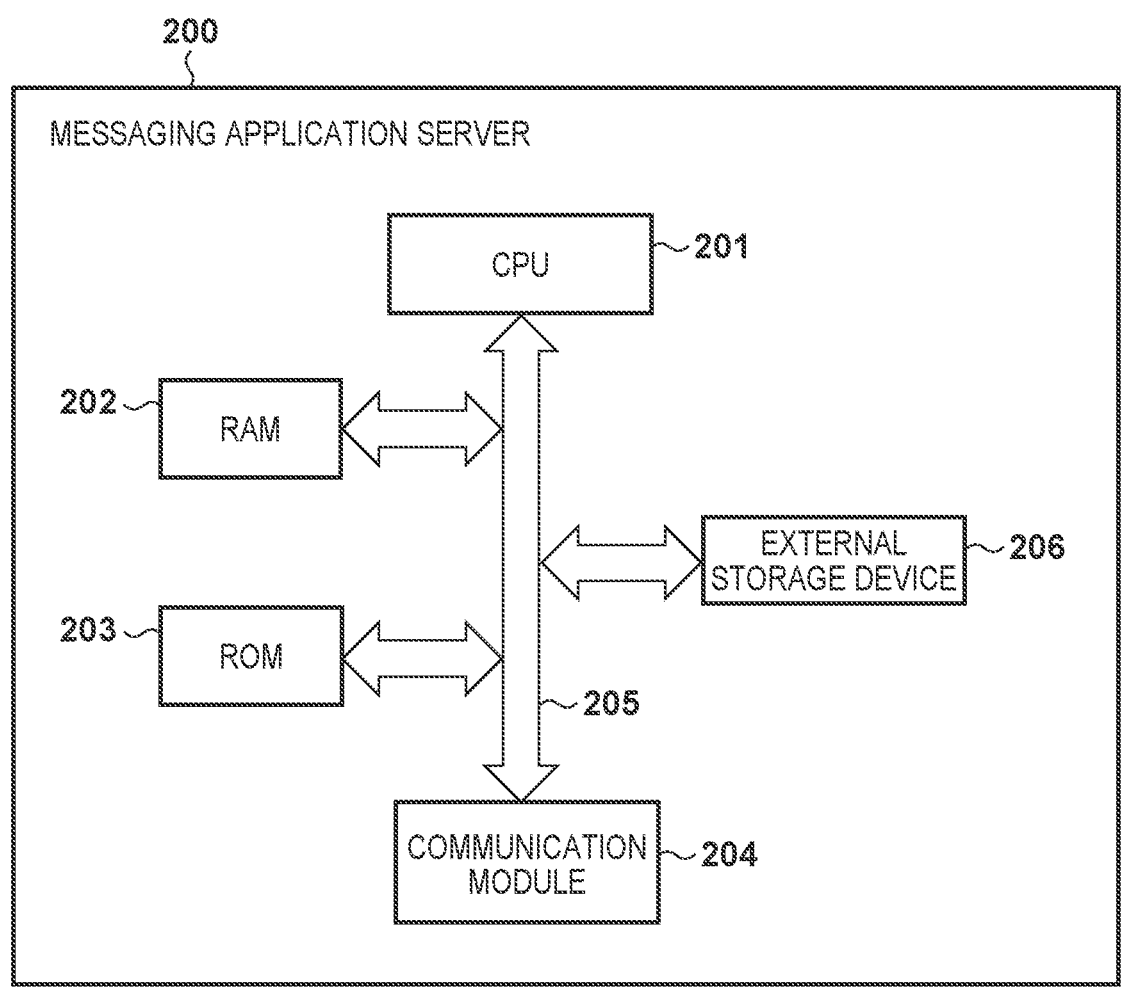
FIG. 3 is a block diagram showing an example of the arrangement of a messaging application server.

FIG. 3 is a block diagram showing an example of the hardware arrangement of the messaging application server 200 according to the embodiment. The messaging application server 200 includes a CPU 201, a RAM 202, a ROM 203, a communication module 204, and an external storage device 206.

The CPU 201 calculates, determines, and controls data and instructions in accordance with programs stored in the RAM 202 and the ROM 203. The RAM 202 is a volatile storage area and is used as a temporary storage area by the CPU 201 to perform various kinds of processing. The ROM 203 is a nonvolatile storage area. The communication module 204 is an interface for communicating with an external apparatus which is connected, for example, via a LAN cable. The communication module 204 connects to a communication device (not shown) such as a router and performs data communication with the client terminal 100 and the bot application server 300 via the network 1000. Note that this data communication may be performed wirelessly by, for example, an interface supporting wireless communication. The external storage device 206 stores an operating system (OS) and various kinds of data such as an application and the like. A system bus 205 exchanges data between the components included in the messaging application server 200.

The hardware arrangements of the bot application server 300 and the Web print server 400 are the same as the arrangement of the messaging application server 200 described above, and thus a detailed description will be omitted. Note that each server is not limited to the above-described arrangement and may, for example, have an arrangement included in a general information processing apparatus or have different arrangements from each other.

Figure 4:
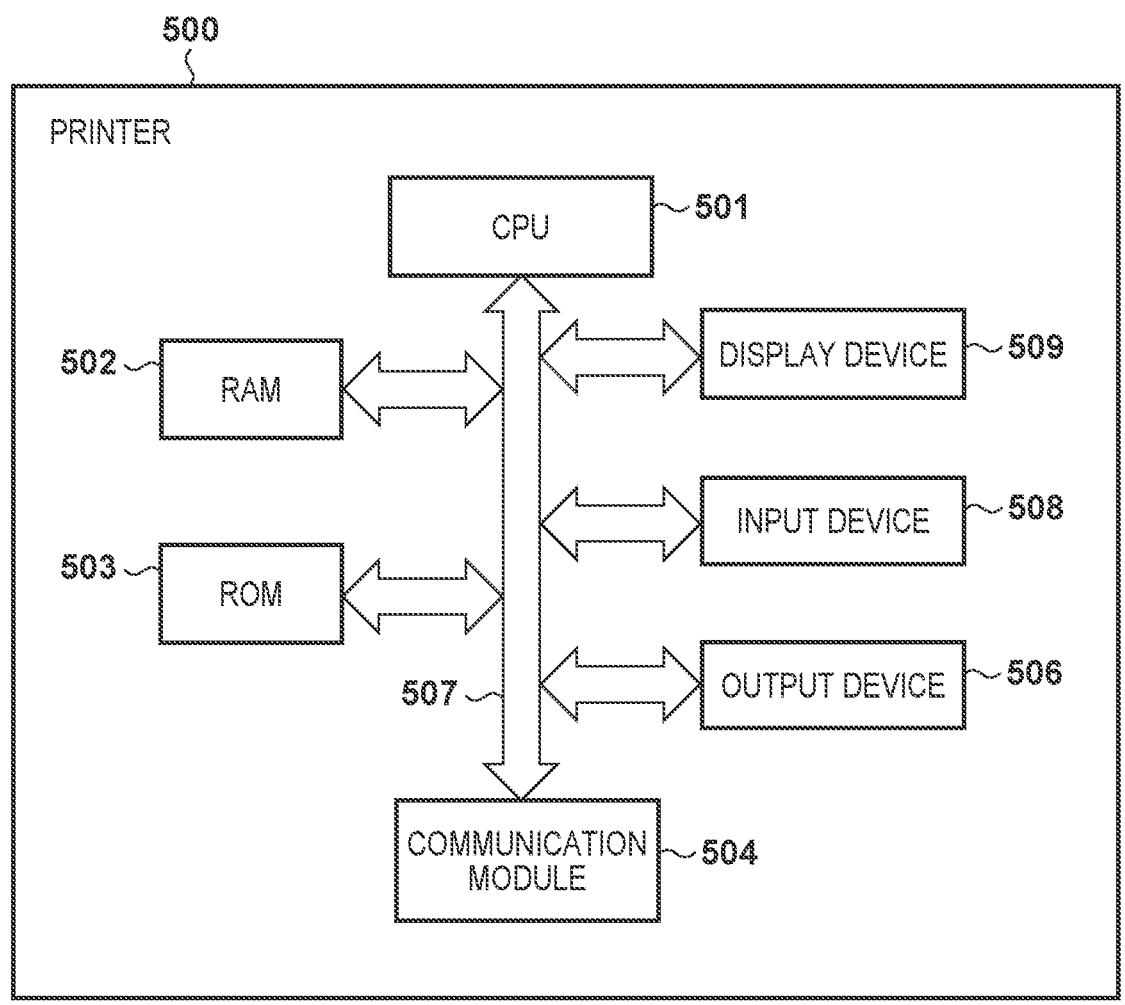
FIG. 4 is a block diagram showing an example of the arrangement of a printer according to the present invention.

FIG. 4 is a block diagram showing an example of the hardware arrangement of the printer 500 according to the embodiment. The printer 500 includes a CPU 501, a RAM 502, a ROM 503, a communication module 504, an output device 506, an input device 508, and a display device 509.

The CPU 501 calculates, determines, and controls data and instructions in accordance with programs stored in the RAM 502 and the ROM 503. The RAM 502 is a volatile storage area and is used as a temporary storage area by the CPU 501 to perform various kinds of processing. The ROM 503 is a nonvolatile storage area and stores an operating system (OS), the Web browser 510, and other application software. The ROM 503 may also be a nonvolatile memory represented by a flash memory in which data can be rewritten. The communication module 504 is an interface to communicate with an external apparatus which is connected, for example, via the LAN cable. The communication module 504 connects to a communication device (not shown) such as a router and performs data communication with the Web print server 400 via the network 1200. Note that the data communication may be performed wirelessly by, for example, an interface supporting wireless communication.

The output device 506 is a device for forming an image on a print sheet (print medium) such as a paper sheet or the like, and is, for example, a printing unit. The input device 508 is a panel operated by the user to provide various kinds of instructions to the printer 500 and is, for example, formed by hard keys. The display device 509 displays a graphical user interface (GUI) and the like. The display device 509 may be formed by a full-color liquid crystal display or a small number of LEDs. Note that a touch panel display integrating the input device 508 and the display device 509 may be used. A system bus 507 exchanges data between the components included in the printer 500.

As described above, assume that the printer 500 according to the embodiment is a network printer capable of communicating with an external apparatus via the network. The arrangement of the printer 500 according to this embodiment is not limited to the above-described arrangement and may further include components corresponding to its functions. For example, an MFP (multi-function peripheral) may be used as the printer 500. In addition, a plurality of printers may be arranged in the system, and the printers may have different functions from each other.

Figure 5:
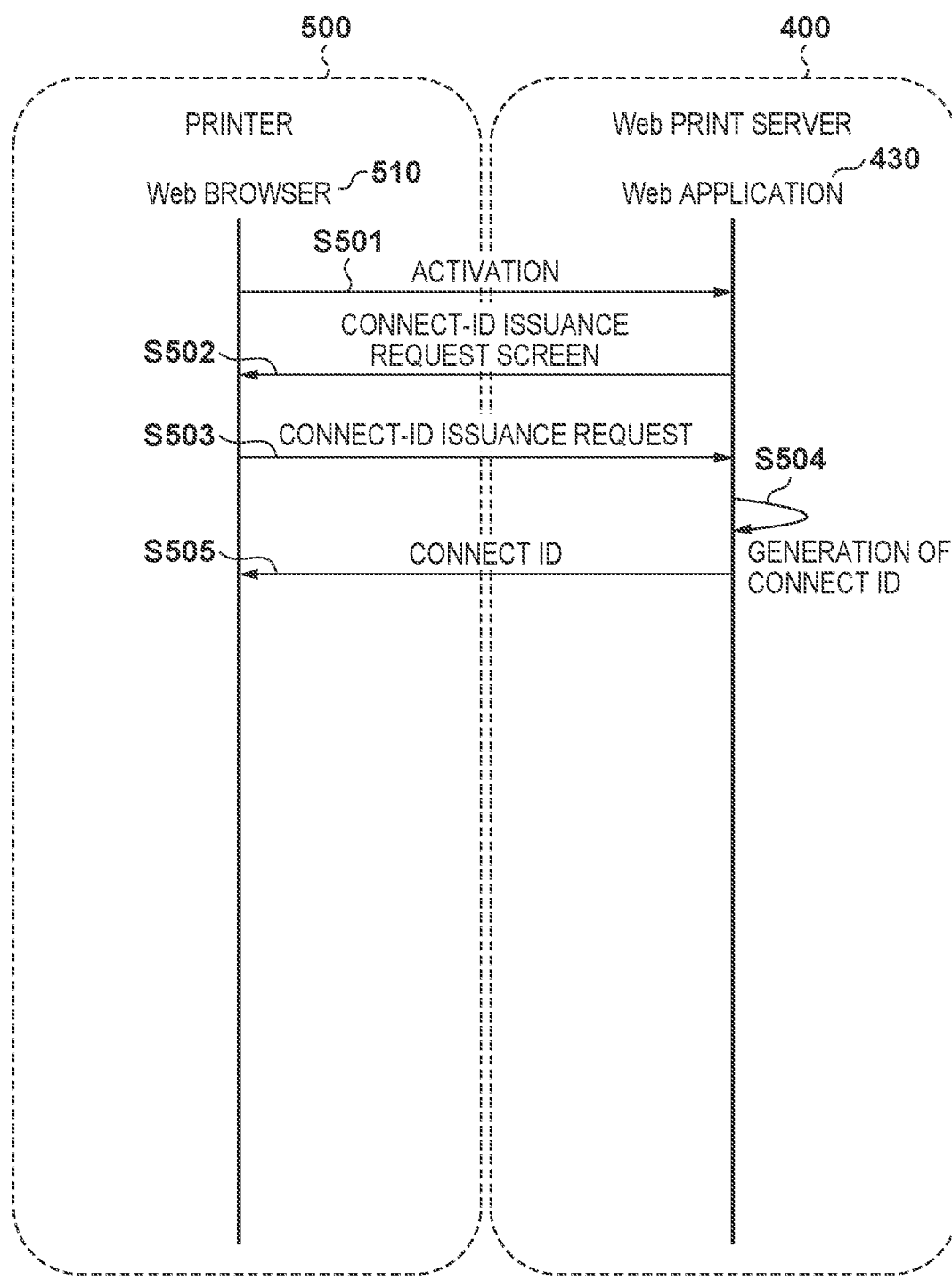
FIG. 5 is a sequence chart showing connect-ID issuance processing according to the present invention.

[Processing Sequence]
(Connect-ID Issuance Processing)
FIG. 5 is a sequence chart showing processing in which the connect ID of a printer is issued according to the embodiment. Also, FIGS. 7A and 7B show examples of the screen of the Web application 430 according to the connect-ID issuance processing.

In S501, the Web browser 510 of the printer 500 transmits an activation request to the Web application 430 of the Web print server 400 upon accepting an activation instruction via a user operation to issue the connect ID.

Figure 7A:
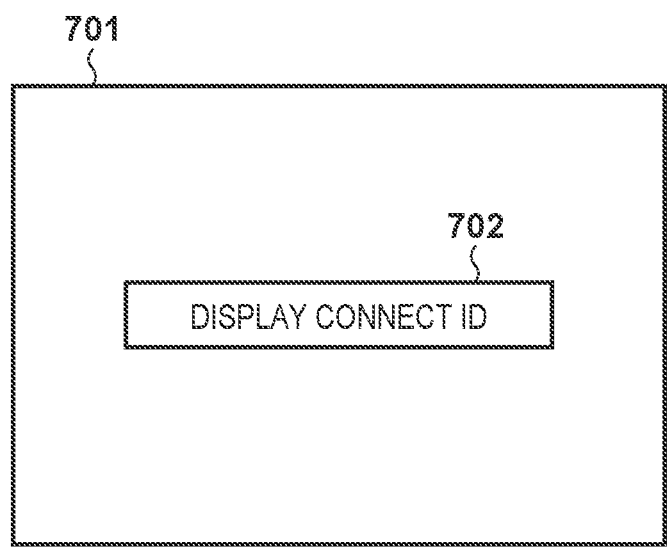
FIGS. 7A and 7B are views each showing an example of a connect-ID issuance processing screen according to the present invention.
Figure 7B:
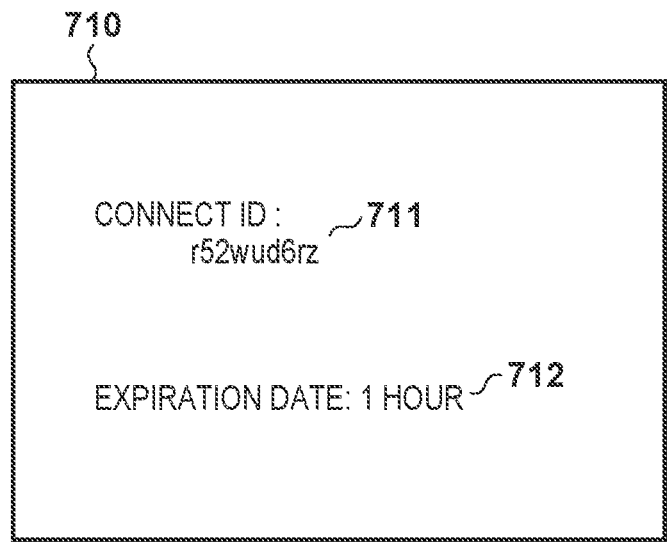

In S502, the Web application 430 returns a connect-ID issuance request screen 701 shown in FIG. 7A as a response to the request.

In S503, the Web browser 510 displays the connect-ID issuance request screen 701. Upon accepting an issuance instruction by a user operation made via an issuance request button 702 on the connect-ID issuance request screen 701, the Web browser 510 transmits a connect-ID issuance request to the Web application 430. The connect-ID issuance request includes a printer ID which is the unique identifier (identification information) of the printer 500 in the print service 420.

In S504, upon receiving the connect-ID issuance request, the Web application 430 performs a search in the database 440 based on the printer ID included in the request and determines whether the printer ID is already registered. If the printer ID is registered, a random value having a fixed digit count is issued as the connect ID. Note that it is assumed that the user has registered the printer ID in the Web print server 400 before requesting the connect ID. The connect ID is used as the authentication information when the printer 500 is to be registered. In addition, the Web application 430 stores the issued connect ID, the printer ID, and the printer information obtained from the database 440 by using the printer ID as a key, and the expiration date of the connect ID in the temporary storage database 450. Although an example in which a 9-digit random value is generated as the connect ID will be described here, the present invention is not limited to this, and the generation method of the random value is also not particularly limited to this. Furthermore, a predetermined value or a period from a predetermined timing may be used as the expiration date of the connect ID.

FIG. 6 shows an example of the arrangement of a connect-ID management table 600 managed by the temporary storage database 450 according to the embodiment. In the connect-ID management table 600, the connect ID, the printer ID, the printer type, and the expiration date are managed in association with each other. Note that in FIG. 6, two connect IDs ("amskri6ej" and "abdbdc612") are being managed for the same printer ID ("05001"). This is because the connect ID issuance has been performed twice for this single printer. For example, if the user operates the printer 500 to make a request for a connect ID corresponding to the bot application 310, a connect ID will be issued for the bot application 310 (for the bot application server 300). Subsequently, if the user operates the printer 500 to make a request for another connect ID for another bot application, the other connect ID for the other bot application (for the other bot application server) will be issued. As a result, two connect IDs are issued for the same printer. Note that although it is not included in FIG. 6, in order to cope with such processing, application IDs (BOT0001, BOT0002, and the like) may be further managed in the connect-ID management table 600 shown in FIG. 6. In this embodiment, different connect IDs will be issued even for the same user if the expiration date has passed. Note that it may be arranged so that a different connect ID will be issued (updated) even if the same user makes the connect-ID issuance request again within the expiration date. In addition, it may be arranged so that only the expiration date will be updated if the same user makes the connect-ID issuance request again within the expiration date.

In S505, the Web application 430 returns a connect-ID display screen 710 of the Web page which includes the connect ID generated in S504 as a response to the connect-ID issuance request to the Web browser 510. As shown in FIG. 7B, the connect-ID display screen 710 is formed so as to display a connect ID 711 and the information of an expiration date 712. Note that the connect-ID display screen 710 may further include information related to the printer.

(Registration Processing)

Figure 8:
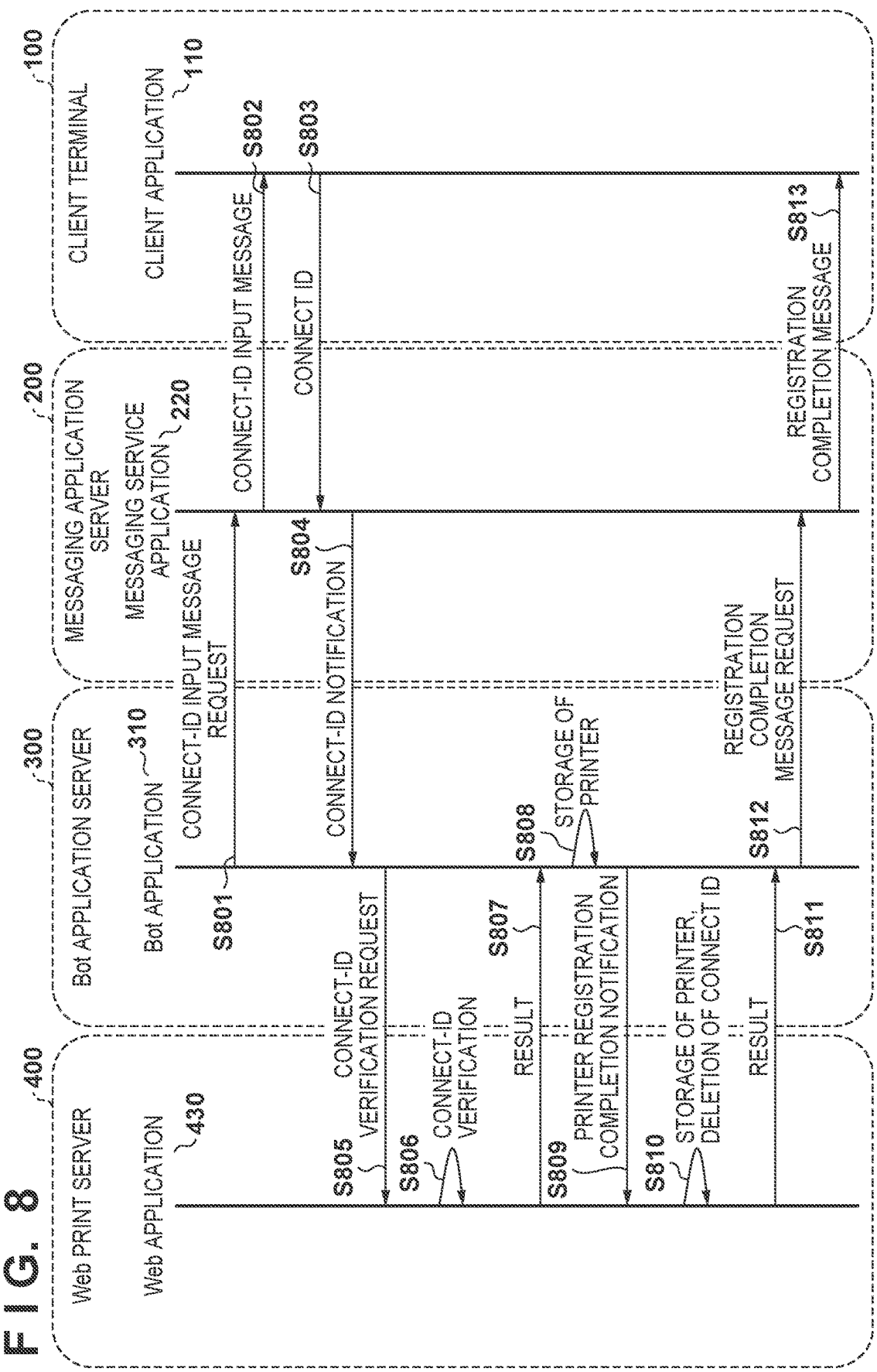
FIG. 8 is a sequence chart showing registration processing according to the present invention.

FIG. 8 is a sequence chart showing the registration processing of the client application 110 and the printer 500 according to the embodiment. The sequence shown in FIG. 8 is started, for example, when the user makes a registration processing request from the client terminal 100. In addition, FIGS. 9A to 9C are examples of a message conversation screen of the client application 110 displayed in the registration processing according to this embodiment. Messages and image files transmitted from the user and the message conversation partner are sequentially displayed from above in time-series on the message conversation screen provided by the client application 110. Assume here that speech balloons on the left-hand side of the screen represent messages and images transmitted from the conversation partner and speech balloons on the right-hand side of the screen represent messages and images transmitted from the user. In the examples shown in FIGS. 9A to 9C, the conversation partner is the bot application 310 serving as a virtual user and is indicated here as a "Print Bot User". In addition, this is also indicated as a "Print Bot" in the icon on the left-hand side of the screen.

In S801, the bot application 310 transmits a connect-ID input message request to the messaging service application 220.

In S802, in response to receiving the connect-ID input message request, the messaging service application 220 transmits a connect ID input message to the client application 110. Upon receiving the connect-ID message request, the client application 110 displays a connect-ID input message 901 on the conversation screen as shown in FIG. 9A. The contents of the connect-ID input message 901 are not particularly limited and are displayed in accordance with the contents of the message received from the client application 110.

As shown in FIG. 9A, assume that the user has input the connect ID ("r52wud6rz" in this case) as a message 902 from the client application 110 on the client terminal 100. Subsequently, after the connect ID has been input, the user makes an instruction to transmit the connect ID. In accordance with this operation, the client application 110 transmits, in S803, the input connect ID to the messaging service application 220.

In S804, the messaging service application 220 transmits a notification including the connect ID received from the client application 110 and the identification information that can individually identify the client application 110 as the message transmission source in S803. This identification information that can individually identify the client application 110 may be unique for each client application 110. In addition, if it is arranged so that the user is required to log in to the client application 110 when the client applications is to be used, this identification may be the identification information unique to the login user.

In S805, the bot application 310 transmits, to the Web application 430, a request to verify the connect ID included in the notification received in S804. The verification request here includes at least the connect ID input in S803 and the application ID assigned to the bot application 310 by the print service 420. Assume that "BOT0001" is the application ID assigned to the bot application 310 in this case.

In S806, the Web application 430 refers to the connect-ID management table 600 stored in the temporary storage database 450 and performs verification of the connect ID indicated in the verification request. More specifically, the Web application 430 determines whether the connect ID indicated in the verification request is present in the connect-ID management table 600 and has not expired. The Web application 430 will determine that the connect ID is valid and authentic if this condition is satisfied. If the connect ID has expired here, the Web application 430 will delete the connect ID from the connect-ID management table 600. Note that, as described above, the connect-ID management table 600 shown in FIG. 6 may further manage the application ID. The process of S806 performed in such a case will be described. The Web application 430 can determine that the application ID (for example, BOT0001) and the connect ID indicated in the verification request received in S805 are present in the same record in the connect-ID management table 600 of FIG. 6 and that the expiration date has not passed.

In S807, the Web application 430 returns, to the bot application 310, the verification result obtained in S806 as a response to the verification request. If the connect ID is valid, the Web application 430 will return the printer ID and the printer information such as the printer type obtained from the temporary storage database 450 together with the verification result to the bot application 310. On the other hand, if the connect ID is invalid, the bot application 310 will suspend the registration processing and will make a request to transmit a registration error message to the client application 110 via the messaging service application 220. In this case, the client application 110 will display a registration error message 904 as shown in FIG. 9B.

In S808, upon receiving a notification that the connect ID is valid in S807, the bot application 310 stores the received printer information and the identification information of the client application 110 received in S804 in the database 330. An example of the management table to be arranged in the database 330 here will be described later with reference to FIG. 10A. At this time, if the same set of client application identification information and the printer ID is already registered in the management table, the bot application 310 will transmit an already-registered message to the client application 110 via the messaging service application 220. In this case, the client application 110 displays an already registered message 905 on the conversation screen as shown in FIG. 9C.

In S809, the bot application 310 transmits a registration completion notification to the Web application 430. This notification includes at least the connect ID and the application ID of the bot application 310.

In S810, upon receiving the registration completion notification, the Web application 430 stores, in the database 440, the printer ID and the application ID of the bot application indicated in the registration completion notification. More specifically, the Web application 430 obtains, from the connect-ID management table 600 shown in FIG. 6, the printer ID corresponding to the connect ID included in the registration completion notification received in S809. Subsequently, the Web application 430 stores the printer ID obtained from the connect-ID management table 600 and the application ID of the bot application included in the registration completion notification in the database 440 (FIG. 10B). The arrangement of the management table provided in the database 440 will be described later with reference to FIG. 10B. In addition, the Web application 430 deletes the connect ID from the connect-ID management table 600 of the temporary storage database 450.

In S811, the Web application 430 notifies the bot application 310 of the registration result.

In S812, upon receiving the registration result, the bot application 310 transmits a registration completion message request to the messaging service application 220.

In S813, upon receiving the registration completion message request, the messaging service application 220 transmits a registration completion message to the client application 110. Upon receiving the registration completion message, the client application 110 displays the registration completion message 903 on the conversation screen as shown in FIG. 9A. Subsequently, the sequence ends.

FIGS. 10A and 10B show examples of management tables according to this embodiment. A management table 1001 holds client application identification information, a printer ID, and a printer type name in association with each other.

The management table 1001 is stored in the database 330 by the bot application 310. For example, the management table 1001 is updated in S808 of FIG. 8. Note that in S808, if the applicable client application identification information is present the management table 1001, the registration processing may be continued by deleting the record corresponding to this identification information from the management table 1001 or the registration may be suspended. In addition, it may be arranged so as to permit the redundancy of the client application identification information and allow a plurality of printers to be registered.

A management table 1002 holds each application ID and a printer ID in association with each other. The management table 1002 is stored in the database 440 by the Web application 430 in S810 of FIG. 8. Note that even in a case in which the user performs the registration processing for the printer 500 and another bot application which is different from the bot application 310, the same processing as that of FIG. 8 will be executed basically. Hence, in a case in which the user executes the processing of FIG. 8 for another bot application, for example, an application ID (for example, BOT0002) corresponding to the other bot application and the input printer ID will be managed in the table shown in FIG. 10B.

(Print Processing)

Figure 12:
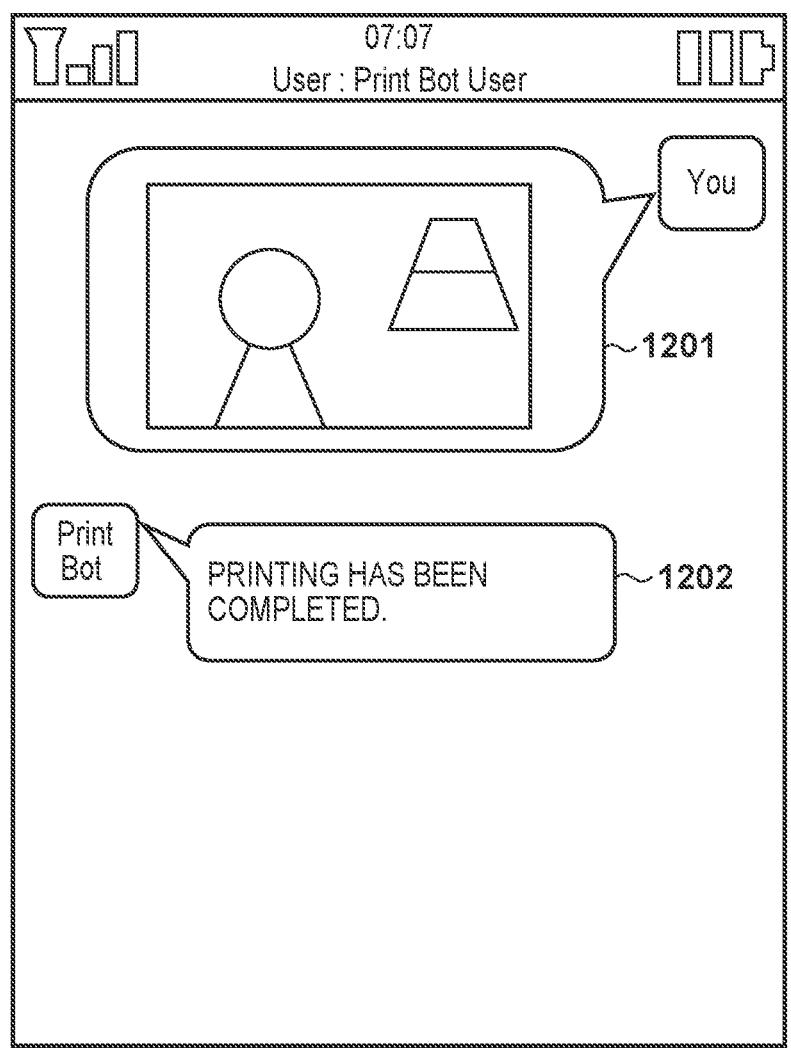
FIG. 12 is a view showing an example of a message conversation screen used in the print processing according to the present invention.

FIG. 11 is a sequence chart showing processing until the printer 500 prints an image file transmitted from the client application 110 by the user according to this embodiment. FIG. 12 shows an example of a message conversation screen of the client application 110 in the processing to cause the printer 500 to print an image file transmitted from the client application 110 by the user according to this embodiment.

First, the user performs an operation to upload an image file from the client application 110 by operating the input device 105 of the client terminal 100. By this operation, a message 1201 indicating the image file is displayed on the conversation screen as shown in FIG. 12. In S1101, as a result of this operation, the client application 110 transmits the designated image file to the messaging service application 220 of the messaging application server 200.

In S1102, upon receiving the image file, the messaging service application 220 transmits an image upload notification to the bot application 310 of the bot application server 300. The notification performed here includes at least the identification information of the client application 110 which is the message transmission source in S1101. This identification information may be unique to each client application 110. Alternatively, if it is arranged so that the user is required to log in to the client application 110 when the client application is to be used, it may be the identification information unique to the login user.

In S1103, upon receiving the image upload notification, the bot application 310 transmits an image file obtainment request to the messaging service application 220.

In S1104, upon receiving the image file obtainment request, the messaging service application 220 responds to the bot application 310 by transmitting the requested image file in return.

In S1105, bot application 310 specifies the printer ID of the printer which is to perform the printing by referring to the management table 1001 by using, as the key, the identification information of the client application 110 included in the notification received in S1102. For example, in the example of FIG. 10A, in a case in which identification information "C0001" has been designated in the notification, the printer ID of the printer to perform the printing will be "03679".

In S1106, the bot application 310 generates print request information. Note that the print request information includes the print setting information, the identification information of the client application 110 included in the notification received in S1102, the print target image file, and the printer ID specified in S1105.

In S1107, the bot application 310 transmits a print request to the Web application 430. The print request includes the print request information generated in S1106 and the application ID ("BOT0001" in this example) assigned to the bot application 310 by the print service.

In S1108, the Web application 430 searches the management table 1002 based on the application ID included in the received print request and the printer ID included in the print request information. The Web application 430 confirms whether the bot application 310 is permitted to use the printer 500. A case in which a bot application is permitted to use the printer corresponds to a case in which the application ID and the printer ID are registered in the management table 1002.

In S1109, if the use is permitted, the Web application 430 stores the print target image file included in the print request information in the file storage 410.

In S1110, the Web application 430 generates a print job from the image file read out from the storage destination information of the print target image file and the print setting information included in the print request information included in the print request.

In S1111, the Web application 430 transmits the generated print job to the print service 420.

In S1112, upon receiving the print job, the print service 420 transmits a print job notification to the printer 500.

In S1113, upon receiving the print job notification, the printer 500 makes a print job request to the print service 420.

In S1114, upon receiving the print job request, the print service 420 transmits the print job to the printer 500 as a response to the request.

In S1115, upon receiving the print job, the printer 500 causes the output device 506 to perform an output process based on the print job.

In S1116, after the output process has been completed, the printer 500 transmits a print result notification to the print service 420.

In S1117, upon receiving the print result notification, the print service 420 transmits the print result notification to the Web application 430.

In S1118, the Web application 430 transmits the print result notification to the bot application 310.

In S1119, upon receiving the print result notification, the bot application 310 transmits a print result notification message transmission request to the messaging service application 220.

In S1120, upon receiving the print result notification message transmission request, the messaging service application 220 transmits a print result message to the client application 110. As a result, the client application 110 displays a print result message 1202 on the conversation screen as shown in FIG. 12. Subsequently, this processing sequence ends.

(Registration Release Processing)

Figure 13:
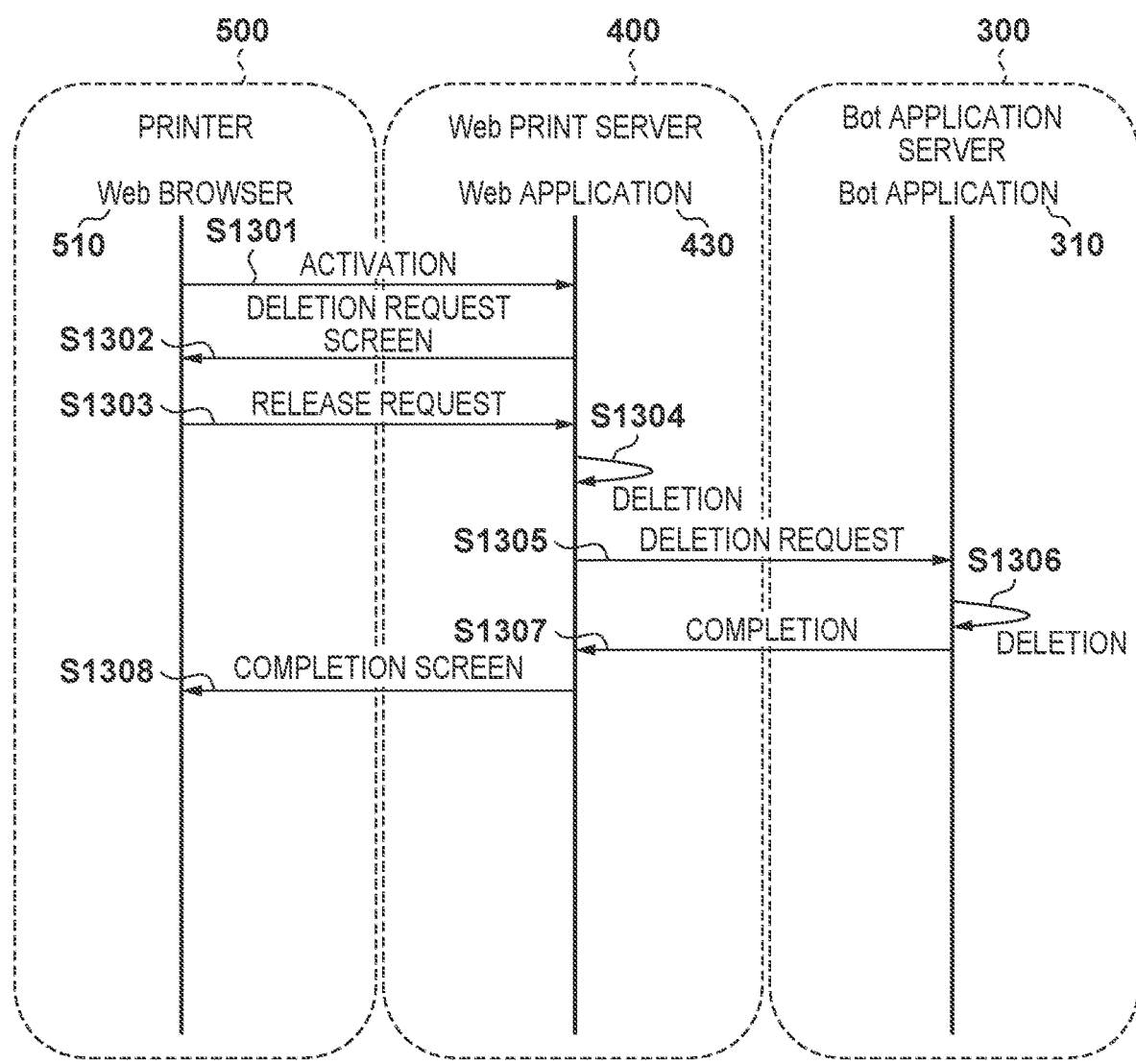
FIG. 13 is a sequence chart of registration release processing according to the present invention.
Figure 14A:
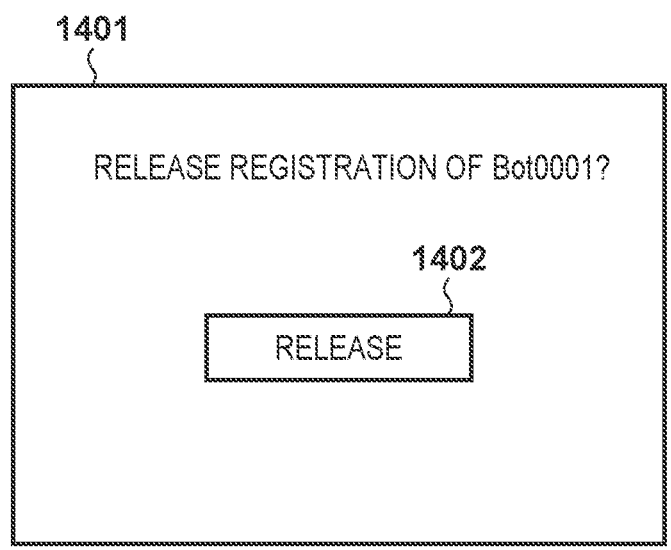
FIGS. 14A and 14B are views showing examples of registration release processing screens according to the present invention.
Figure 14B:
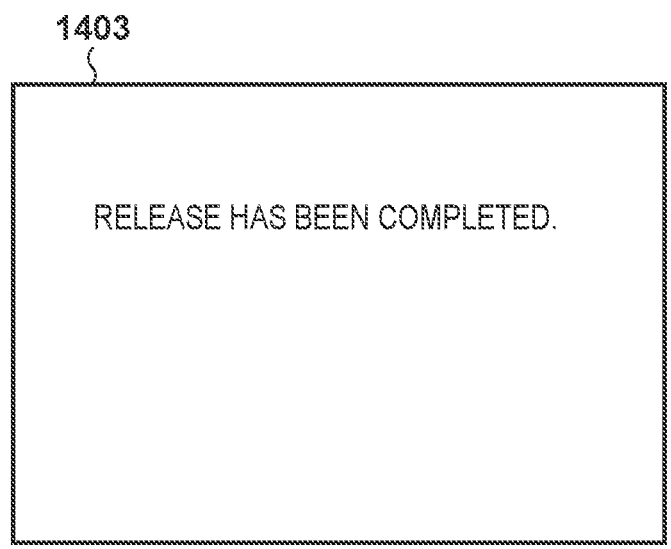

FIG. 13 shows a sequence chart of printer registration release processing according to the embodiment. The sequence shown in FIG. 13 is started when, for example, the user makes a registration release processing request from the printer 500. FIGS. 14A and 14B show examples of the screens of the Web application 430 in the printer registration release processing according to the embodiment.

In S1301, the Web browser 510 of the printer 500 accepts a user operation instructing the activation of the Web application 430. As a result, the Web browser 510 transmits an activation request to the Web application 430.

In S1302, the Web application 430 returns a release request screen 1401 shown in FIG. 14A to the Web browser 510. The release request screen 1401 includes a release request button 1402 for instructing the printer registration to be released. In addition, the application ID ("BOT0001" in this example) of the registered application (the bot application 310 in this case) is displayed in the release request screen 1401.

When the release request button 1402 on the release request screen 1401 is pressed by the user, the Web browser 510 transmits a release request to the Web application 430. The release request transmitted here includes the printer ID which is the identification information of the printer 500 in the print service and the application ID ("BOT0001" in this example) of the bot application 310.

In S1304, upon receiving the release request, the Web application 430 deletes the set of the application ID and the printer ID included in the release request from the management table 1002 in the database 440.

In S1305, the Web application 430 transmits a delete request to the bot application 310. The delete request transmitted here includes at least the printer ID of the printer.

In S1306, upon receiving the delete request, the bot application 310 deletes all of the pieces of registration information associated with the printer ID in the management table 1001 of the database 330.

In S1307, the bot application 310 transmits deletion processing completion notification to the Web application 430.

In S1308, upon receiving the completion notification, the Web application 430 transmits a completion screen 1403 shown in FIG. 14B to the Web browser 510. Subsequently, the sequence ends.

In this embodiment, it is assumed that only the bot application 310 will use the print service provided by the Web print server 400. In contrast, for example, in a case in which a plurality of applications can use the print service, it can be arranged so that these applications will be displayed in a list in a selectable manner on the release request screen 1401 and the user can select the application to be released from the list. In addition, the release request screen 1401 may be displayed by operating, before the executing the processing of FIG. 13, the printer 500 to select the release target bot application from the bot application 310 and another bot application and subsequently making the release request.

Figure 16:
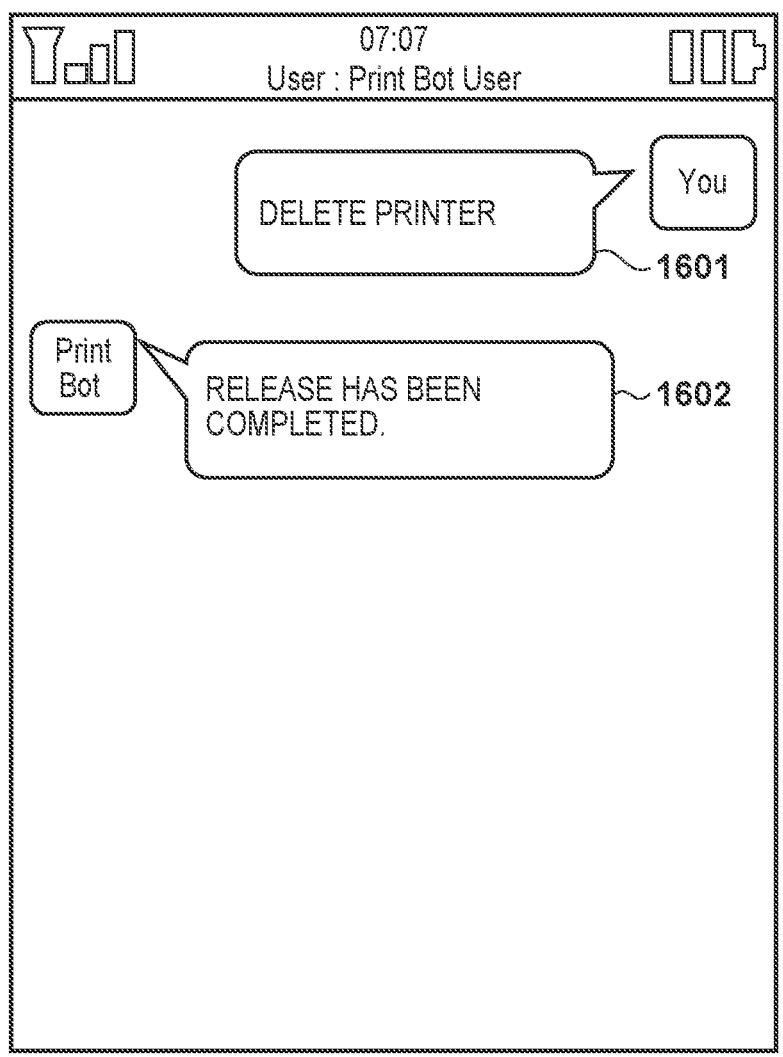
FIG. 16 is a view showing an example of the registration release processing screen according to the present invention.

FIG. 15 shows the sequence chart of the printer registration release processing performed from the client application 110. FIG. 16 shows an example of the screen of the client application 110 during the printer registration release processing according to the embodiment. That is, in this embodiment, the registration release processing can be instructed from the printer 500 and the client application 110.

First, the user makes an operation from the client application 110 to release the printer registration by operating the input device 105 of the client terminal 100. A description will be made here by assuming that a message "delete printer" will be input. A release request message 1601 is displayed on the conversation screen as shown in FIG. 16 by this operation. As a result of this operation, the client application 110 will transmit, in S1501, the release request message to the messaging service application 220.

In S1502, upon receiving the release request message, the messaging service application 220 transmits a release request to the bot application 310. The release request transmitted here includes the identification information of the client application 110 which is the transmission source of the message in S1501. This identification information may be unique to each client application 110. Alternatively, if it is arranged so that the user is required to log in to the client application 110 when the client application is to be used, it may be the identification information unique to the login user.

In S1503, upon receiving the release request, the bot application 310 refers to the management table 1001 of the database 330 and deletes the identification information of the client application and the printer ID associated to this information.

In S1504, the bot application 310 transmits a release completion message for the client application 110 to the messaging service application 220.

In S1505, upon receiving the release completion message, the messaging service application 220 transmits the completion message to the client application 110. As a result, a completion message 1602 is displayed on the conversation screen as shown in FIG. 16. At this time, the information of the printer that has been released from the registration may be displayed. Subsequently, the processing sequence ends.

As described above, according to this embodiment, it is possible to implement printing via a messaging application. In addition, it is possible to easily and safely perform the registration of the messaging application and the printer information registered in the cloud print service.

Note that this embodiment described a case in which the connect-IC issuance of the Web application 430 is executed on the Web browser 510 of the printer 500. However, the present invention is not limited to this. For example, a connect-ID issuance request may be executed via the Web browser 120 on the client terminal 100. In this case, a list of registered printers is displayed on the Web browser 120 to the user logged in to the print service, and a printer may be selected by the user.

In addition, the registration release from the Web browser 510 is performed on an application ID basis in this embodiment. However, the present invention is not limited this, and the registration release may be performed on a client application basis or the user basis by adding the identification information of the client application 110 or the identification information used to specify the user who is to use the client application to the management table 1002.

Furthermore, although this embodiment described a case in which the user of the client application 110 and the owner of the printer 500 are the same, they may be different.

[Printing Operation]

A case in which the messaging application is used to print an image will be described here. The screen display at the time of the execution of the printing operation will be described with reference to FIGS. 17A to 17C.

Figure 17A:
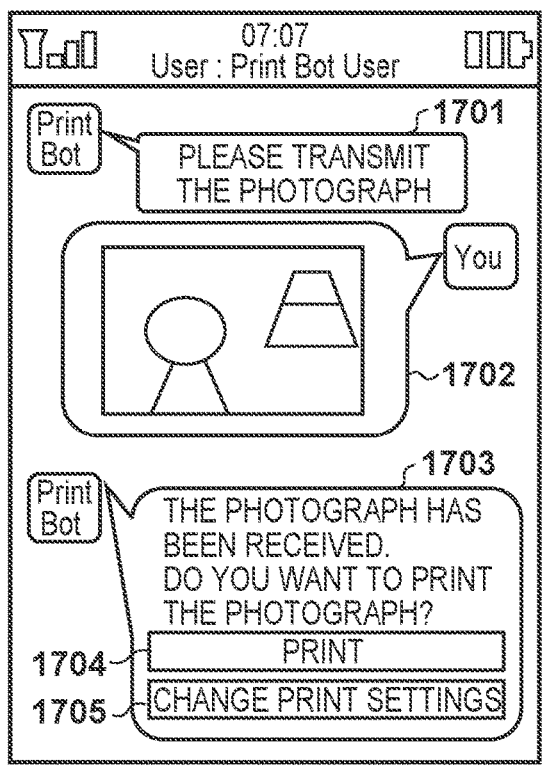
FIGS. 17A to 17C are views for explaining a printing operation according to the present invention.

FIG. 17A shows an example of a message conversation screen displayed by the client application 110 on the display device 104 of the client terminal 100. Messages and image files transmitted from the user and the message conversation partner are sequentially displayed from above in time-series on the message conversation screen provided by the client application 110. Assume here that speech balloons on the left-hand side of the screen represent messages and images transmitted from the conversation partner and speech balloons on the right-hand side of the screen represent messages and images transmitted from the user. In the example shown in FIG. 17A, the conversation partner is the bot application 310 serving as a virtual user and is indicated here as a "Print Bot User". In addition, this is also indicated as a "Print Bot" in the icon on the left-hand side of the screen.

In FIG. 17A, the bot application 310 transmits (S1101) a message 1701 requesting the transmission of an image file (a photograph in this case) which is to be the print target. Upon receiving this message, the user transmits the image file as a message 1702. The bot application 310 then transmits a message 1703 as a response to the message 1702. The message 1703 includes buttons as shown by buttons 1704 and 1705 other than a text indicating the reception of the image file. The user can press these buttons to transmit a fixed message to the conversation partner and to make settings to activate the Web browser and access a specific URL. Note that the text shown in the message 1703 is merely an example and may be another character string. Also, although FIG. 17A shows an example in which buttons are provided in the message, the present invention is not limited to this, and a message formed by another object may be used.

For example, in a case in which the button 1704 of FIG. 17A is pressed, the client application 110 will transmit a print request instruction message to the messaging service application 220. In addition, in a case in which the button 1705 is pressed, an instruction will be given to open the access URL of the Web page for updating the print settings which is included in the message 1703. In this case, an instruction will be made to activate the Web browser 120 of the client terminal 100 from the client application 110.

Note that the embodiment described an operation mode in which the Web browser 120 is activated by a specific URL when the button is pressed. However, the same effect can be obtained by an arrangement in which a direct URL link is displayed instead of the button in the message and the Web browser 120 is activated when the user selects the link.

In a case in which the button 1705 shown in FIG. 17A is pressed, the Web browser 120 transmits a request for the Web page for updating the print settings to the Web application 320 of the bot application server 300. Upon receiving the Web page request, the Web application 320 obtains the print request information corresponding to the requested URL information from the database 330. The Web application 320 generates the Web page for print settings from the initial print setting information of the obtained print request information, and returns the generated Web page as a response to the above-described request to the client terminal 100.

Figure 17B:
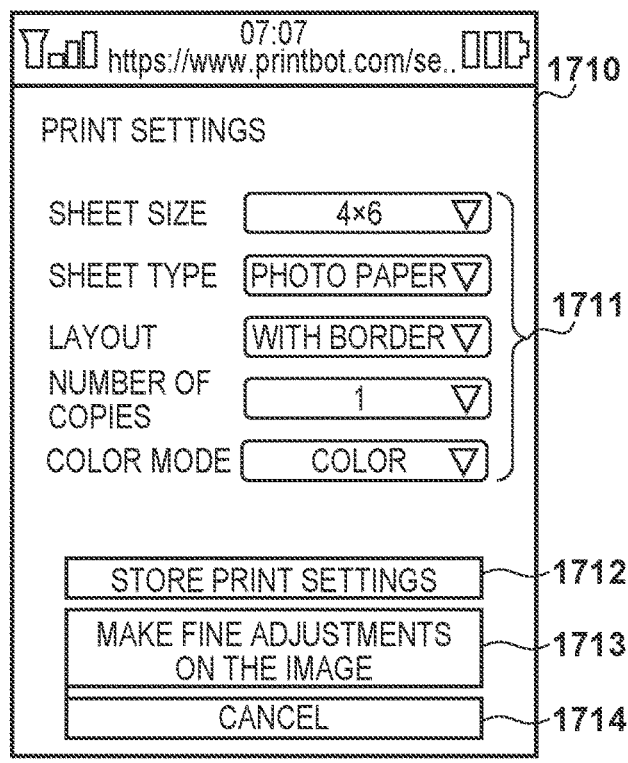

FIG. 17B shows an example of a print setting screen 1710 as the Web page for print settings that has been returned from the Web application 320 of the bot application server 300. In the print setting screen 1710, the setting values of the respective print setting items such as the print sheet size, the sheet type, the layout, and the like can be changed by fields arranged as setting items 1711. Note that each print setting included in the setting items 1711 is merely an example, and for example, other print settings may be included in accordance with the function of the printer 500. When a button 1712 arranged in a lower portion of the print setting screen 1710 is pressed, the setting values of the respective print setting items selected at this point and the settings made on an image print region adjustment screen 1720 shown in FIG. 17C (to be described later) are confirmed, and the print setting screen 1710 will be closed. When a button 1713 is pressed, the screen shifts to the image print region adjustment screen 1720 shown in FIG. 17C. When the button 1714 is pressed, the print setting contents that have been changed up to that point are discarded. In accordance with this, the Web browser 120 is ended and closed.

Figure 17C:
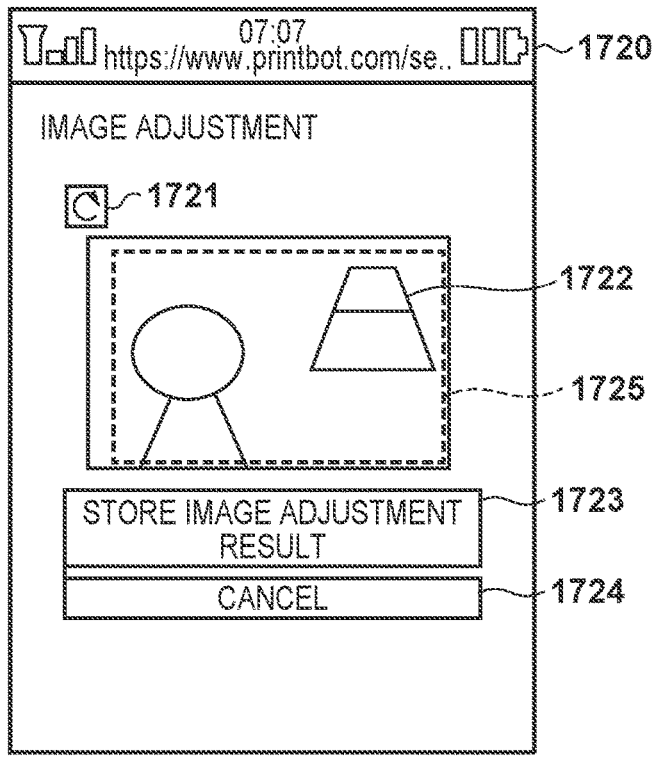

In the image print region adjustment screen 1720 shown in FIG. 17C, a preview image of the image file to be the print target is displayed as an image region 1722. Furthermore, a rectangular region 1725 (a range indicated by broken lines in this case) whose aspect ratio is equal to that of the sheet size set in the setting items 1711 of the print setting screen 1710 shown in FIG. 17B is overlapped and displayed on the image region 1722. The print region can be adjusted by translating and scaling the image region 1722 by a user operation. When a rotate button 1721 is pressed, the image displayed in the image region 1722 can be rotated with respect to the sheet-size rectangular region. When a button 1723 is pressed, the screen returns to the print setting screen 1710 shown in FIG. 17B in a state in which the changes in the position, magnification, and image position information such as the rotation information, and the like are saved. When a cancel button 1724 is pressed, the operation performed in FIG. 17C is discarded, and the screen returns to the print setting screen 1710 shown in FIG. 17B. Note that although a return operation to the print setting screen 1710 shown in FIG. 17B has been described as the operation performed when the buttons 1723 and 1724 are pressed in the image print region adjustment screen 1720 shown in FIG. 17C, the present invention is not limited to this. For example, an arrangement in which the print setting information will be updated directly on the image print region adjustment screen 1720 may be provided as the operation of each of the buttons 1723 and 1724.

The user changes the print settings on a Web page for print settings such as is shown in each of FIGS. 17B and 17C and presses the button 1712 to instruct the print setting update. In accordance with this, the Web browser 120 of the client terminal 100 transmits a print setting change request to the Web application 320 of the bot application server 300. The print setting change request transmitted here includes the identification information for uniquely identifying the print request information which is to be the print setting change target and the various kinds of print setting information designated by the user on the Web page for print settings. The Web application 320 of the bot application server 300 which receives the print setting change request updates the print setting information of the print request information stored in the database 330. Note that the transmission processing of the message 1703 and the operation using FIGS. 17B and 17C may be performed between S1104 and S1106 of FIG. 11.

After the above-described operation has been executed, the conversation screen is displayed in the client terminal 100, and the message 1703 as shown in FIG. 17A is displayed again. In this case, the image file included in the message 1702 is printed based on the updated print setting information when the user presses the button 1704. That is, the print setting information included in the print request information in S1107 is the print setting information that has been changed by using FIGS. 17B and 17C.

As described above, according to this embodiment, it is possible to implement printing via a messaging application. Note that although the above-described embodiment described an example in which a different connect ID is issued for each bot application, a different connect ID may be issued on another basis. For example, in a case in which the printer has a user login function, a different connect ID may be issued on a user basis.

Second Embodiment

The second embodiment of the present invention will describe a form which provides a means that can easily reprint an image file of which a user has made a print instruction in the past. Note that the same reference numerals denote components overlapping with those in the first embodiment, and a description thereof will be omitted.

[Processing Sequence]
(Print Setting Update)

Figure 18:
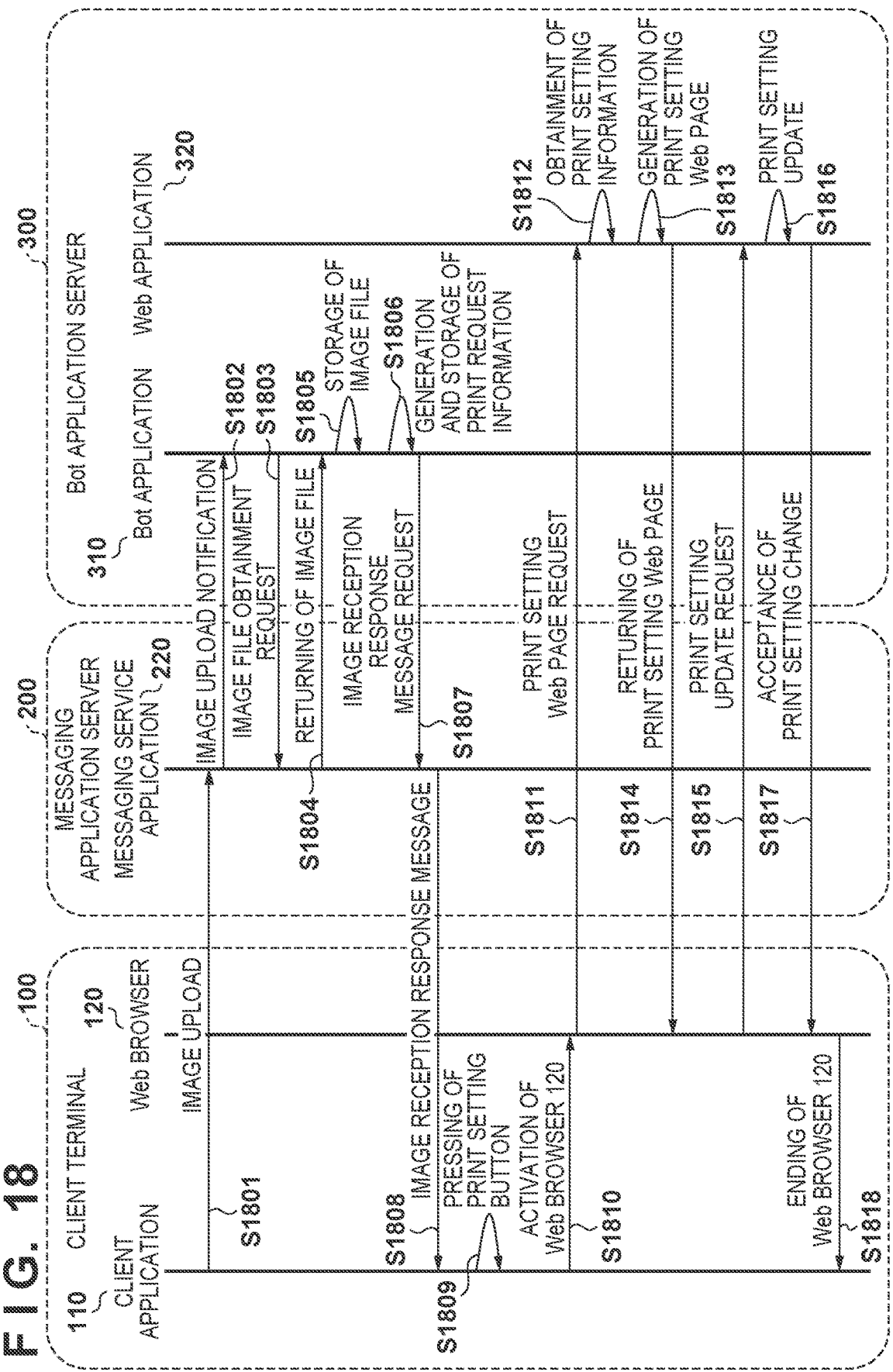
FIG. 18 is a sequence chart of print setting change processing according to the second embodiment.

FIG. 18 is a sequence chart showing processing until the print setting update is performed used when a user operates a client terminal 100 to transmit (upload) an image file to a bot application server 300 and prints the image file.

The user performs an operation to upload an image file from a client application 110 by operating an input device 105 of the client terminal 100. In accordance with this, in S1801, the client application 110 transmits the designated image file to a messaging service application 220 of a messaging application server 200.

In S1802, upon receiving the image file, the messaging service application 220 transmits an image upload notification to a bot application 310 of the bot application server 300. Here, the notification transmitted in S1802 includes at least the identification information that can individually identify the client application 110 of the message transmission source in S1801. This identification information may be unique to each client application 110. Alternatively, if it is arranged so that the user is required to log in to the client application 110 when the client application is to be used, it may be the identification information unique to the login user.

In S1803, upon receiving the notification transmitted in S1802, the bot application 310 transmits an image file obtainment request to the messaging service application 220 based on the information included in this notification.

In S1804, upon receiving the request transmitted in S1803, the messaging service application 220 transmits the requested image file as a response to the bot application 310.

In S1805, the bot application 310 stores the obtained image file in a file storage 340.

In S1806, the bot application 310 generates print request information summarizing the storage destination information of the file storage 340 in which the image file is stored, the initial print setting information, and the identification information of the client application 110 included in the notification in S1802. In addition, the bot application 310 generates a URL (Uniform Resource Locator) to access a Web page for updating the identification information of the generated print request information, the expiration date information, and the print setting information of the print request. Subsequently, the bot application 310 associates these pieces of information with the print request information and stores the associated pieces of information in a database 330. The Web page for updating the print setting information of the print request will be described later.

In S1807, the bot application 310 transmits an image reception response message request to the messaging service application 220 in order to transmit an image reception response message to the client application 110. The request transmitted here includes the URL which is generated in S1806 and is used to access the Web page for updating the print setting information and the identification information that can identify the client application 110 received in the notification in S1802.

In S1808, the messaging service application 220 receives the image reception response message transmitted in S1807. Upon receiving this message, the messaging service application 220 transmits an image reception response message to the target client application 110 in accordance with the identification information of the client application 110 included in the request. The image reception response message includes at least the information of the access URL of the Web page for updating (changing) the print setting information.

The sequence will be described here in association with the screens shown in FIGS. 17A to 17C described in the first embodiment. A message 1701 is the message (not shown in FIG. 18) transmitted by the bot application 310. A message 1702 is a message transmitted (corresponding to S1801 in FIG. 18) by the user to transmit an image file in response to the message 1701. A message 1703 is the image reception response message (corresponding to S1808 in FIG. 18) which is displayed by the messaging service application 220 based on the image reception response message request transmitted by the bot application 310 as a response to the reception of the image file.

For example, in a case in which a button 1704 shown in FIG. 17A is pressed, the client application 110 will transmit a print request instruction message to the messaging service application 220. Also, in a case in which a button 1705 is pressed, an instruction to open the access URL of the Web page for updating the print setting information, which is included in the image reception response message received in S1808 in FIG. 18, will be issued. In this case, the client application 110 will transmit an instruction to activate a Web browser 120.

Note that this embodiment described a form that performs an operation to activate the Web browser 120 based on a specific URL when a button is pressed. However, the same effect can be obtained even in an arrangement in which a URL link is directly displayed instead of a button in the message and the Web browser 120 is activated when the user selects the link. The sequence of processing performed when the button 1705 is pressed will be described hereinafter.

In S1809, the client application 110 accepts the pressing of the button 1705 shown in FIG. 17A by the user.

In S1810, the client application 110 activates the Web browser 120 as an activation option of the access URL the Web page for updating the print setting information.

In S1811, the Web browser 120 transmits a request for the instructed Web page for updating the print setting information to a Web application 320 of the bot application server 300.

In S1812, upon receiving the Web page request, the Web application 320 obtains the corresponding print request information from the database 330 based on the requested URL information.

In S1813, the Web application 320 generates a print setting Web page based on the initial print setting information included in the print request information obtained in S1812.

In S1814, the Web application 320 returns, as a response to the print setting Web page request received in S1811, the print setting Web page generated in S1813 to the Web browser 120. Note that in the process of S1814, the Web application 320 may transmit the identification information for uniquely identifying the print request information.

FIGS. 17B and 17C shown in the first embodiment are examples of the print setting Web page generated in S1813.

The user changes the print setting information and presses a button 1712 to make an instruction to update the print setting information on the print setting Web page as shown in FIGS. 17B and 17C. In accordance with this, in S1815, the Web browser 120 transmits a print setting change request to the Web application 320 of the bot application server 300. The print setting change request transmitted here includes the identification information for uniquely identifying the print request information to be the print setting information change target, the print setting information designated by the user via a print setting screen 1710, and the image position information designated by the user via an image print region adjustment screen 1720.

In S1816, upon receiving the print setting change request, the Web application 320 updates the print setting information of the corresponding print request information stored in the database 330.

In S1817, the Web application 320 responds by transmitting a print setting change acceptance message to the Web browser 120 of the client terminal 100 that transmitted the print setting change request.

In S1818, upon receiving the print setting change acceptance message, the Web browser 120 closes the print setting Web page. Note that it may be arranged so that the Web browser 120 will close the print setting Web page by displaying the print setting change acceptance message in accordance with the reception of the message. Subsequently, the sequence ends. Note that when the Web browser 120 is closed, a screen (for example, FIG. 17A) provided by the client application 110 will be displayed on the client terminal 100.

(Print Execution)

FIG. 19 is a sequence chart showing the processing, according to this embodiment, performed until a printer 500 prints a target image file based on the designated print setting information when the user has made a print instruction by operating the client terminal 100 after the print setting operation described with reference to FIG. 18 has been performed. Note that although the first embodiment described an example of a print execution sequence caused by an image upload in FIG. 11, an example of a print execution sequence caused by a print instruction message will be described here.

When the user presses the button 1704 provided in the message 1703 shown in FIG. 17A, the client application 110 transmits, in S1901, a print instruction message to the messaging service application 220 of the messaging application server 200. The print instruction message transmitted here includes the identification information for identifying the client application 110 as the message transmission source and the identification information of the print request information included in the image reception response message in S1808.

In S1902, upon receiving the print instruction message, the messaging service application 220 transmits the print instruction message notification to the bot application 310 of the bot application server 300. The print instruction message notification transmitted here includes the identification information for identifying the client application 110 and the identification information of the print request information included in the print instruction message in S1901.

In S1903, the bot application 310 obtains the matching print request information from the database 330 based on the identification information of the print request information included in the print instruction message notification received in S1902. Subsequently, the bot application 310 generates a print request from the print request information.

In S1904, the bot application 310 transmits the print request generated in S1903 to a Web application 430 of a Web print server 400.

In S1905, upon receiving the print request, the Web application transmits an image file request to the bot application 310 based on the image file storage destination information included in the print request information.

In S1906, the bot application 310 responds to the image file request received in S1905, obtains the corresponding file from the file storage 340, and transmits the obtained image file to the Web application 430.

In S1907, the Web application 430 generates a print job based on the print request information received in S1904 and the image file obtained in S1906.

In S1908, the Web application 430 transmits a print job notification to the printer 500 via a print service 420.

In S1909, upon receiving the print job notification, the printer 500 transmits a print job request to the Web print server 400.

In S1910, upon receiving the print job request, the Web application 430 transmits a print job as a response to the printer 500.

In S1911, upon receiving the print job, the printer 500 performs print processing based on the print job by using an output device 506.

In S1912, upon completion of the print processing, the printer 500 transmits a print result notification to the Web print server 400.

In S1913, upon receiving the print result notification, the Web application 430 transmits the print result notification to the bot application 310.

In S1914, upon receiving the print result notification, the bot application 310 transmits a request to transmit a print result notification message to the messaging service application 220.

In S1915, upon receiving the print result message transmission request, the messaging service application 220 transmits a print result message to the client application 110. Subsequently, the sequence ends.

(Table Arrangement)

FIGS. 20A and 20B each show an example of a data table managed by the database 330 of the bot application server 300. A case in which two tables are managed by the database 330 will be exemplified here.

A table T2010 shown in FIG. 20A shows an example of the arrangement of a table for managing the information of the client application 110 and its associated printer 500. In S1802 of FIG. 18, identification information that can uniquely identify the client application 110 is included in the image upload notification received by the bot application 310 from the messaging service application 220. The table T2010 includes this identification information (user ID), information (printer ID) for uniquely identifying a printer associated with the client application 110, and the initial print setting information which is used when printing is performed by the printer. The initial print setting information may include items such as the sheet size, sheet type, the layout, the color mode, and the like as shown in FIG. 20A, but these items are not essential. Other items may be present, and different setting items may be managed in accordance with the printer.

The information managed by the table T2010 is newly generated when the client application 110 and the printer 500 are registered in association with each other.

When generating the print request information in S1806 of FIG. 18, the bot application 310 refers to the table T2010 for a record that matches the identification information which can uniquely identify the client application 110 included in the image upload notification in S1802 of FIG. 18. Subsequently, the bot application 310 sets the print setting information described in the corresponding record as the initial print setting information.

A table T2020 shown in FIG. 20B shows an example of the arrangement of a table for managing the print request information which is generated when the image file upload notification is received by the bot application 310. In the table T2020, the identification information (user ID) of the client application 110, the identification information (print request ID) for uniquely identifying the print request information, the expiration date information (expiration date) of the print request information, the URL (file URL) for accessing the image file which is set as the print target in the print request information and is stored in the file storage 340, and the URL (print setting Web page URL) for accessing the Web page for updating the currently set print setting information are held in association with each other. A predetermined period from, for example, the date and time at which the image file was stored in S1805 of FIG. 18 or the date and time at which the print request was generated in S1806 can be set as the expiration date. In addition, the predetermined period may be set arbitrarily by the user of the client terminal 100 or on the side of the server. Note that the method of setting the expiration date to the print request is not limited to that described above.

When generating a print request in S1903 of FIG. 19, the bot application 310 refers to the table T2020 for a record matching the identification information of the print request information included in the print instruction message transmitted in S1902. The bot application 310 then generates the print request based on the print setting information and the file URL in the corresponding record.

In this embodiment, an expiration date is arranged for each print request, and print processing is performed after determining the expiration date when an image file is to be reprinted or the like. Processing performed in a case in which the print request has expired will be described hereinafter.

(Notification Processing Performed when Print Request has Expired)

Figure 21:
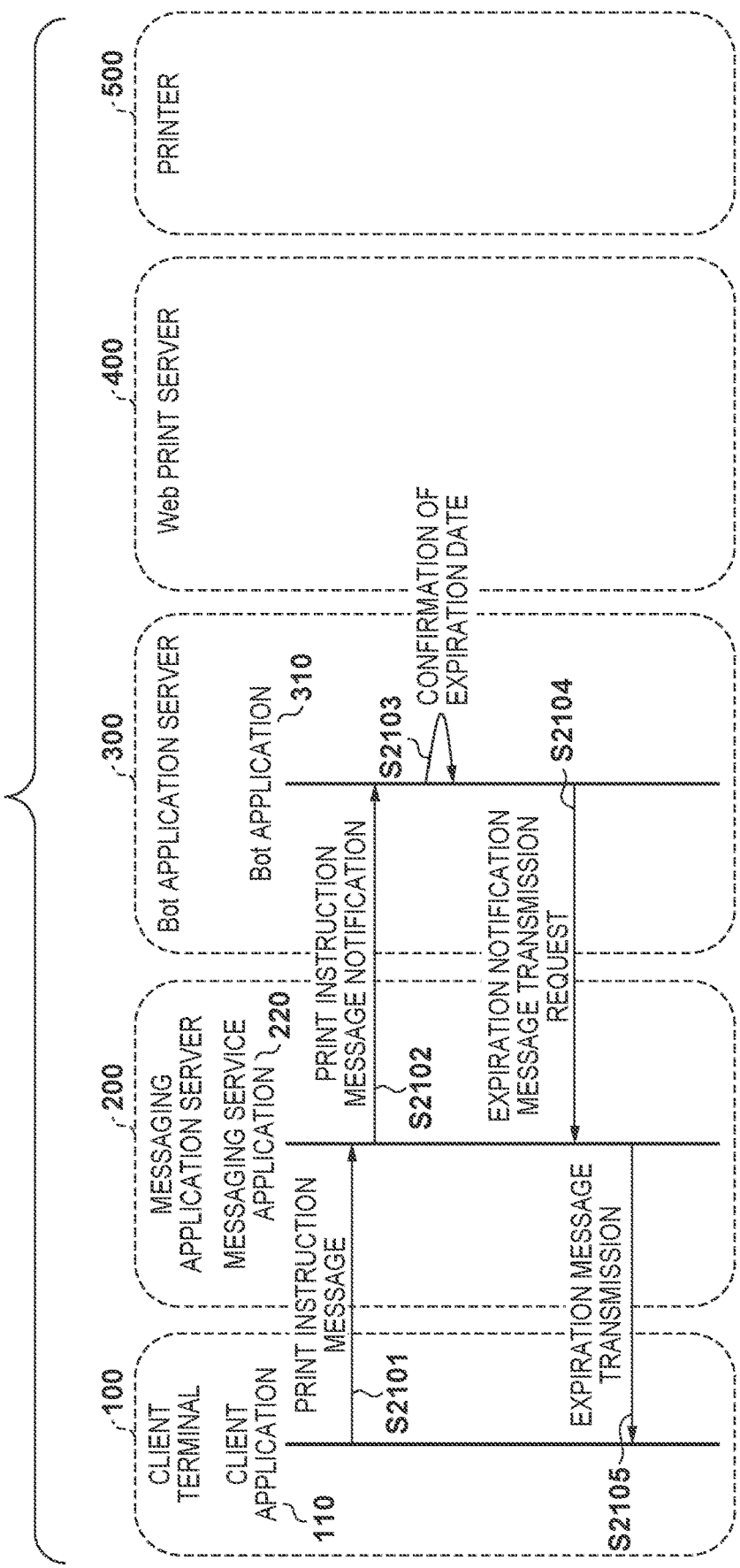
FIG. 21 is a sequence chart of processing performed when print request information has expired.

FIG. 21 shows the sequence performed to notify the user of the expiration of the print request corresponding to the requested print instruction message based on the expiration date information managed in the table T2020 of FIG. 20B.

In S2101, as a result of the user pressing the button 1704 provided in the message 1703 shown in FIG. 17A, the client application 110 of the client terminal 100 transmits a print instruction message to the messaging service application 220.

In S2102, upon receiving the print instruction message, the messaging service application 220 transmits a print instruction message notification to the bot application 310 of the bot application server 300.

In S2103, upon receiving the print instruction message notification from the messaging service application 220, the bot application 310 refers to the table T2020 for a record that matches the identification information of the print request information included in the notification. Subsequently, the bot application 310 determines whether the corresponding record has expired. Note that if it is determined that the record has not expired, the sequence will be the same as the sequence performed from S1903 in FIG. 19.

In S2104, if it is determined that the record has expired as a result of the confirmation in S2103, the bot application 310 will not generate the print request. In this case, the bot application 310 will request the messaging service application 220 to transmit an expiration notification message to the client application 110 of the message transmission source.

In S2105, upon receiving the request to transmit the expiration notification message, the messaging service application 220 transmits the expiration notification message to the request target client application 110. Subsequently, the client application 110 displays a message (not shown) indicating that the print request has expired. Subsequently, the sequence ends.

Figure 22:
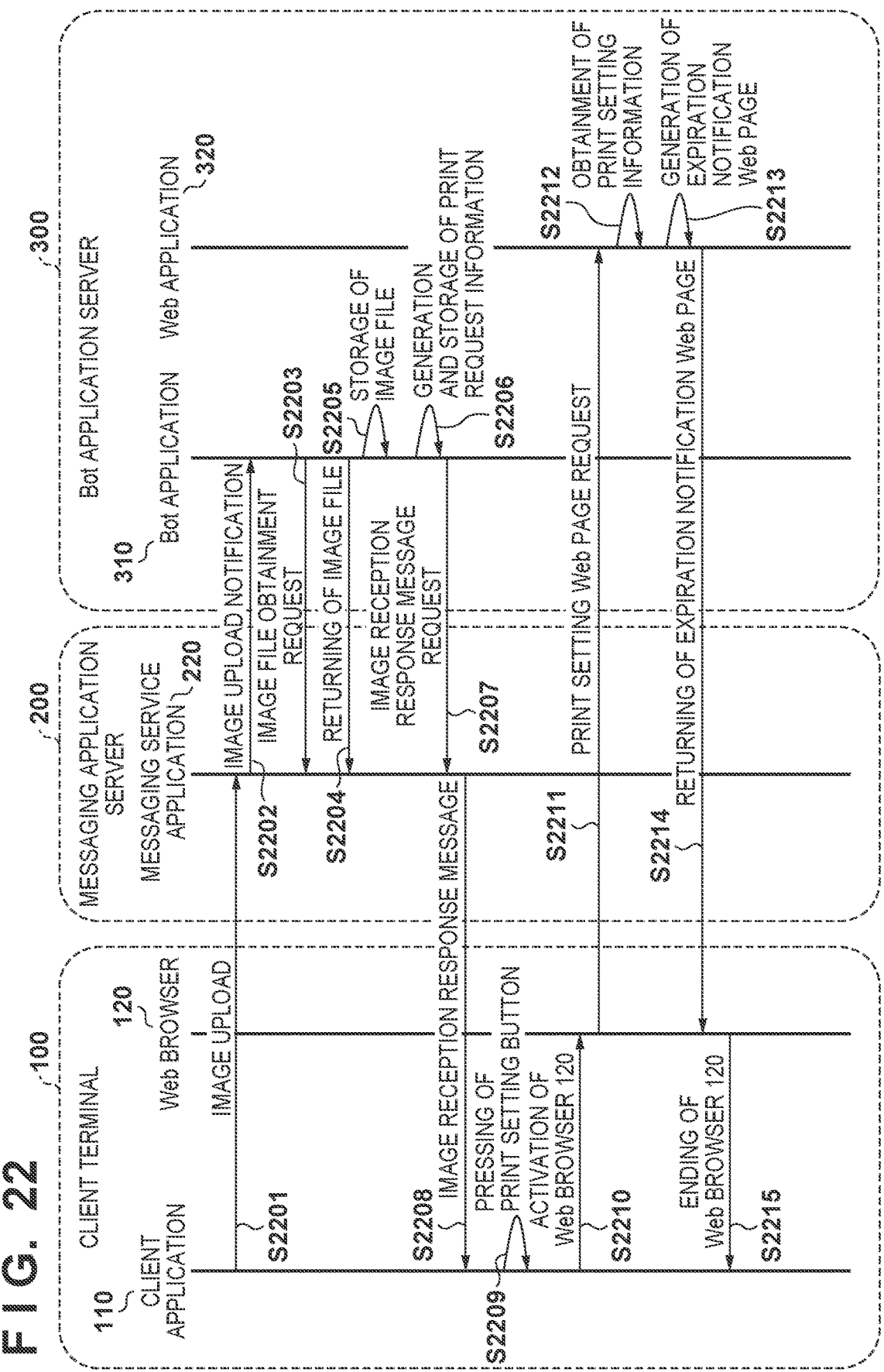
FIG. 22 is a sequence chart of processing performed when the print request information has expired.

FIG. 22 shows the sequence performed in a case in which the expiration of the print request is determined when the print setting Web page is to be accessed via the Web browser 120 in S1810 of FIG. 18. Since the same processes as those of S1801 to S1812 in FIG. 18 are performed in S2201 to S2212, a description will be omitted.

In S2212, the Web application 320 of the bot application server 300 obtains, from the database 330, the corresponding print request information based on the requested URL information and determines whether the print request information has expired. Note that the same sequence as that from S1813 in FIG. 18 will be performed if it is determined that the print request has not expired.

In S2213, if it is determined based on the database 330 in S2212 that the target print request information has not expired, the Web application 320 will not generate the print setting Web page. In this case, the Web application 320 will generate an expiration notification Web page.

In S2214, the Web application 320 returns the expiration notification Web page generated in S2213 to the Web browser 120 of the client terminal 100.

Figure 23:
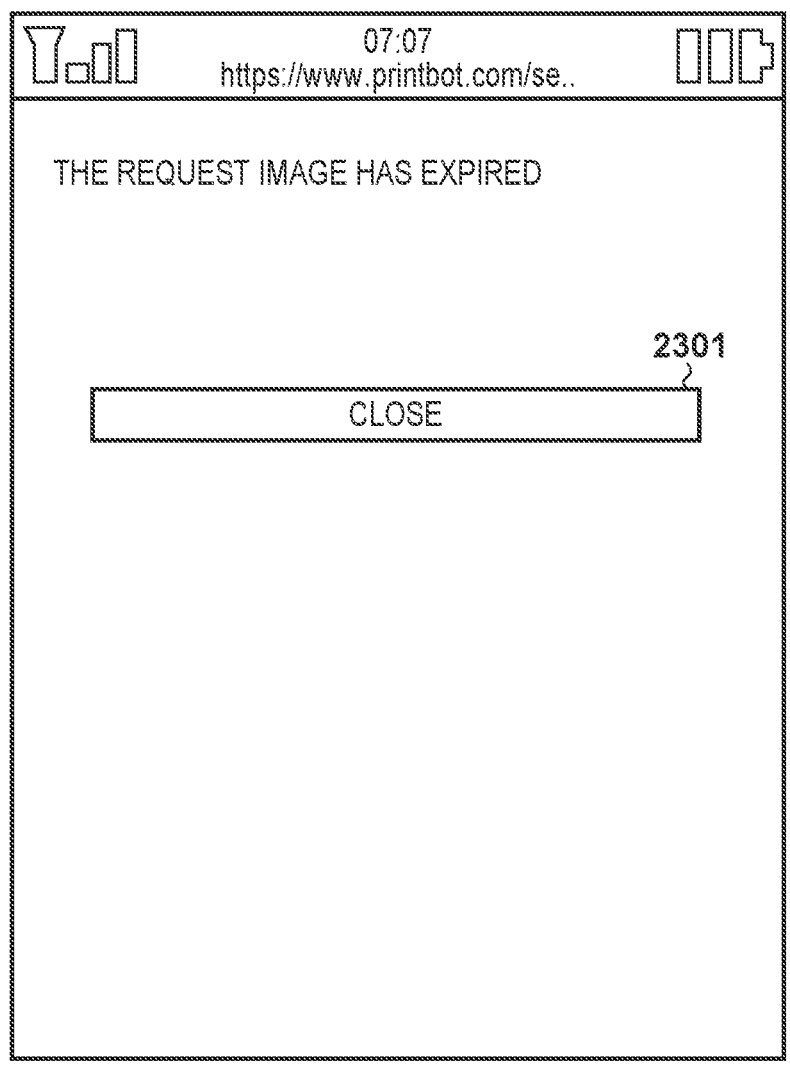
FIG. 23 is a view showing an example of an expiration notification Web page according to the second embodiment.

In S2215, the Web browser 120 displays the expiration notification Web page received in S2214 on a display device 104 of the client terminal 100. FIG. 23 shows a display example of the expiration notification Web page. The Web browser 120 closes the page and ends the process when the user presses a close button 2301 on the page. Subsequently, the processing sequence ends.

Figure 24:
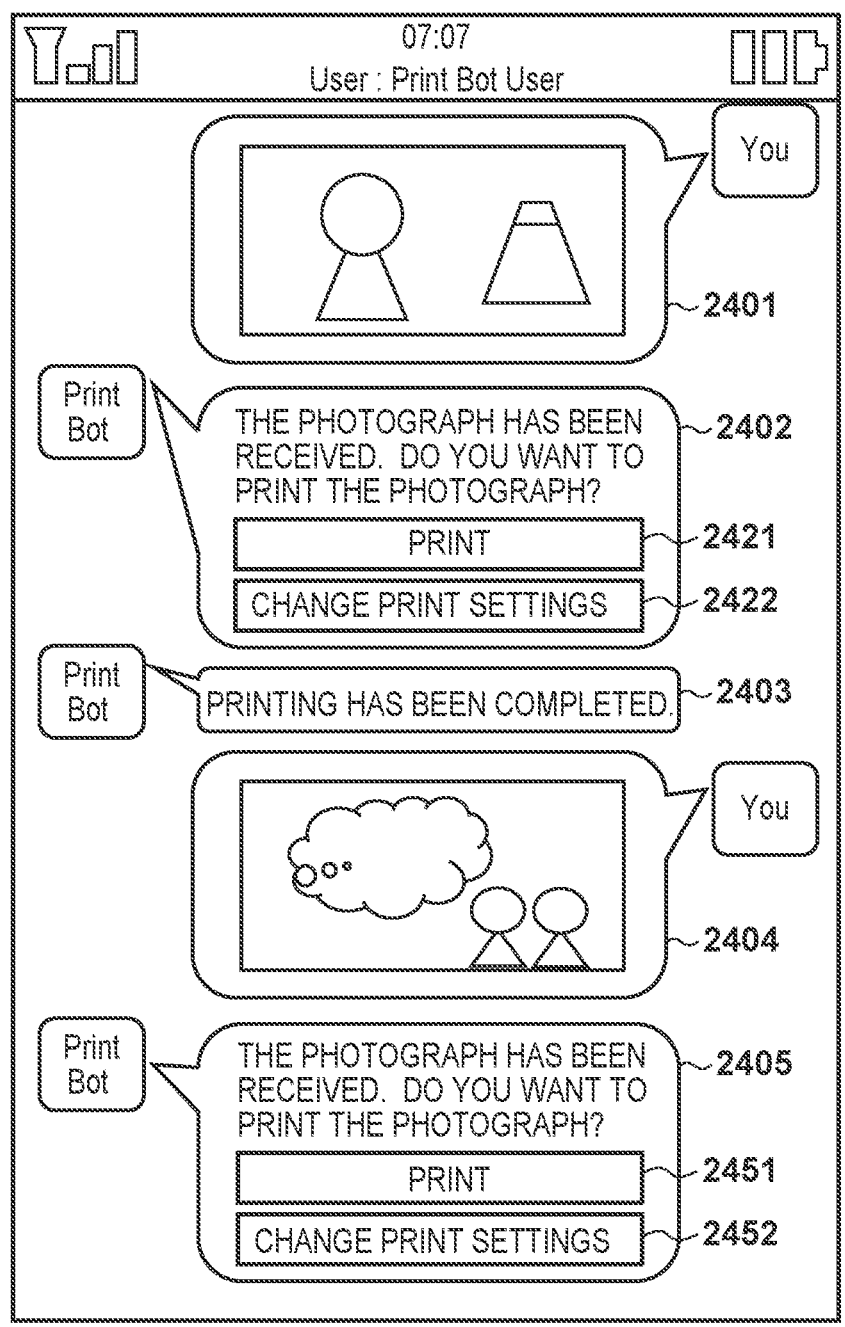
FIG. 24 is a view showing a message conversation screen which is displayed by a client application according to the second embodiment.

FIG. 24 shows, in a message conversation screen displayed by the client application 110 on the display device 104 of the client terminal 100, an example of a screen state in which two or more image reception response messages to the user are displayed. On the other hand, FIGS. 25A and 25B show examples of the print request information registered in the database 330 of the bot application server 300 in this state.

In FIG. 24, a message 2402 is an image reception response message transmitted as a response to a message 2401 (image file) transmitted by the user. A message 2403 is a print result message for notifying the user of the result of the print processing which was performed when the user pressed a button 2421 provided in the message 2402. A message 2405 is an image reception response message transmitted as a response to a message 2404 (image file) transmitted by the user.

FIG. 25A shows, among the data managed in the table T2010 shown in FIG. 20A, a table T2510 that shows information (initial print setting information) associated with the client application 110 displaying the screen of FIG. 24. Assume that the user ID of the client application 110 will be "U000001" in the description here. FIG. 25B shows, from the table T2020 shown in FIG. 20B, a table T2520 that shows the print request information associated with the image files transmitted by the user by the messages 2401 and 2404 in FIG. 24. A record (print request ID "J-1302") in the first row of the table T2520 is the print request information associated with the image file of the message 2401. A record (print request ID "J-1305") in the second row of the table T2520 is the print request information associated with the image file of the message 2404.

Note that although the initial print setting information can include items such as the sheet size, the sheet type, the layout, the color mode, and the like as shown in FIG. 25A, these items are not essential. Other items may be present, and different setting items may be managed in accordance with the printer. In the table T2520, the identification information (user ID) of the client application, the identification information (print request ID) for uniquely identifying the print request information, the expiration date information (expiration date) of the print request information, the URL (file URL) for accessing the image file which is set as the print target in the print request information, and the URL (print setting Web page URL) for accessing the Web page for updating the currently set print setting information are held in association with each other. For example, a predetermined period may be set as the expiration date.

In the example of the record in the first row of the table T2520, the sheet size and the sheet type have been changed to "postcard" and "inkjet postcard", respectively from those in the initial print setting information shown in the table T2510. On the other hand, in the example of the record in the second row of the table T2520, the initial print setting information is used intact.

When the user presses a button 2422 provided in the message 2402, the print setting Web page URL described in the record in the first row of the table T2520 will be requested by the Web browser 120. Subsequently, a print setting Web page as that shown in FIG. 17B is generated based on the print setting information of the record. Hence, when the button 2422 shown in FIG. 24 is pressed, a print setting Web page that has been set in accordance with the print setting information (the sheet size is "postcard", the sheet type is "inkjet postcard", the layout is "with border", and the color mode is "color") of the record in the first row of FIG. 25B is generated.

In addition, when a button 2452 provided in the message 2405 is pressed, the print setting Web page URL described in the record in the second row of the table T2520 will be requested by the Web browser 120. Subsequently, a print setting Web page as that shown in FIG. 17B is generated based on the print setting information (the sheet size is "4×6", the sheet type is "photo paper", the layout is "with border", and the color mode is "color") of the record.

On the other hand, when the user presses the button 2421 provided in the message 2402, a print request is generated based on the print setting information described in the record in the first row of the table T2520 and the image file obtained from the file URL. In addition, when the user presses a button 2451 provided in the message 2405, a print request is generated based on the print setting information described in the record in the second row of the table T2520 and the image file obtained from the file URL.

As described above, in this embodiment, the bot application will manage the print setting information for each image file at the timing at which the image file is received, and will include a unique print setting Web page URL of each image file in the image reception response message which is to be transmitted onto the conversation screen. Hence, the user can individually store the print settings for each transmitted image file. As a result, an image file that has been printed in the past can be printed under the same settings as those used when the image file was previously printed.

Third Embodiment

The above-described second embodiment provided a means for the user to change the print settings for each image file on the Web page for performing print settings as shown in FIG. 17B. On the other hand, there may be a case in which the user desires to set the print setting information to an image file at a certain timing and subsequently continue to perform printing based on the same print setting information. In such a case, the user can set the desired print setting information as the initial setting for the next and subsequent printing operations by changing the initial print settings at the time when the image file is received and the print request information is to be generated.

FIGS. 26A and 26B each show an example of a screen in which a means that allows the user to change the next and subsequent initial print settings has been added to a print setting screen 1710 described with reference to FIG. 17B in the second embodiment. FIG. 26A shows a state in which a print setting Web page has been displayed for the first time. FIG. 26B shows a state at the point in which the user has changed the print setting information and is to press a button 2602 for storing the print setting information. Among the settings included in setting items 2601, the sheet size and the sheet type have been changed here. Since components denoted by reference numerals 2601 to 2604 in FIGS. 26A and 26B are the same as those denoted by reference numerals 1711 to 1714 described in FIG. 17B, a detailed description will be omitted.

When the button 2602 for storing the print settings is pressed in a state in which a check box 2605 has been checked in FIGS. 26A and 26B, the print setting information in the print request information which is managed by the database 330 and is associated with the displayed print setting Web page is updated. Also, together with this update operation, the initial print setting information managed by the database 330 is also updated.

A table T2710 shown in FIG. 27A shows the initial print setting information at the point at which the print setting Web page was generated. "4×6" is set as the sheet size and "photo paper" is set as the sheet type in the initial print settings at this point. A description of the remaining items will be omitted here. A table T2720 shown in FIG. 27B shows the print setting information at the same point as FIG. 27A. Assume that the print setting information which was generated in the past is indicated in the record in the first row of the table T2720 and the target print setting information is indicated in the record in the second row. Since the initial value of the print setting information is determined based on the initial print setting information, "4×6" is set as the sheet size and "photo paper" is set as the sheet type at this point. Hence, the print settings shown in FIG. 26A indicate that "4×6" is set as the sheet size and "photo paper" is set as the sheet type.

Assume here that, as shown in FIG. 26B, the user has changed the sheet size to "postcard" and the sheet type to "inkjet postcard" on a Web browser 120 and further pressed the button 2602 in a state in which the check box 2605 is checked. At this time, the Web browser 120 will also transmit an initial print setting change request along with the print setting change request to a Web application 320 of a bot application server 300. As a result, as shown in a table T2730 of FIG. 27C, the sheet size is changed to "postcard" and the sheet type is changed to "inkjet postcard" in the initial print settings. In addition, as shown in a table T2740 of FIG. 27D, the sheet size is changed to "postcard" and the sheet type is changed to "inkjet postcard" in the print setting information. The print setting information which is to be generated when the user newly transmits an image file onto the conversation screen in this state will be generated based on the updated initial print setting information. Hence, the sheet size will be set as "postcard" and the sheet type will be set as "inkjet postcard" in the print setting information, which corresponds to the newly transmitted image file, stored in the record in the third row of the table T2740 of FIG. 27D.

As described above, this embodiment provides a means for changing the initial print setting information. As a result, the user can easily set print settings that have been set once as the initial settings for the next and subsequent printing setting operations.

Note that although this embodiment exemplified a method of changing the initial print settings on the print setting Web page for each image file, it may be arranged so that a screen for changing only the initial print setting will be provided.

Fourth Embodiment

The above-described third embodiment showed an arrangement in which a button for making a print instruction and a button for opening a print setting Web page by the Web browser 120 are displayed in an image reception response message that is transmitted by the bot application 310 in response to the transmission of an image file. However, for example, there may be a case in which the user desires to only confirm the print setting information. Hence, the fourth embodiment will describe an embodiment that allows the user to easily confirm the print setting information.

Figure 28:
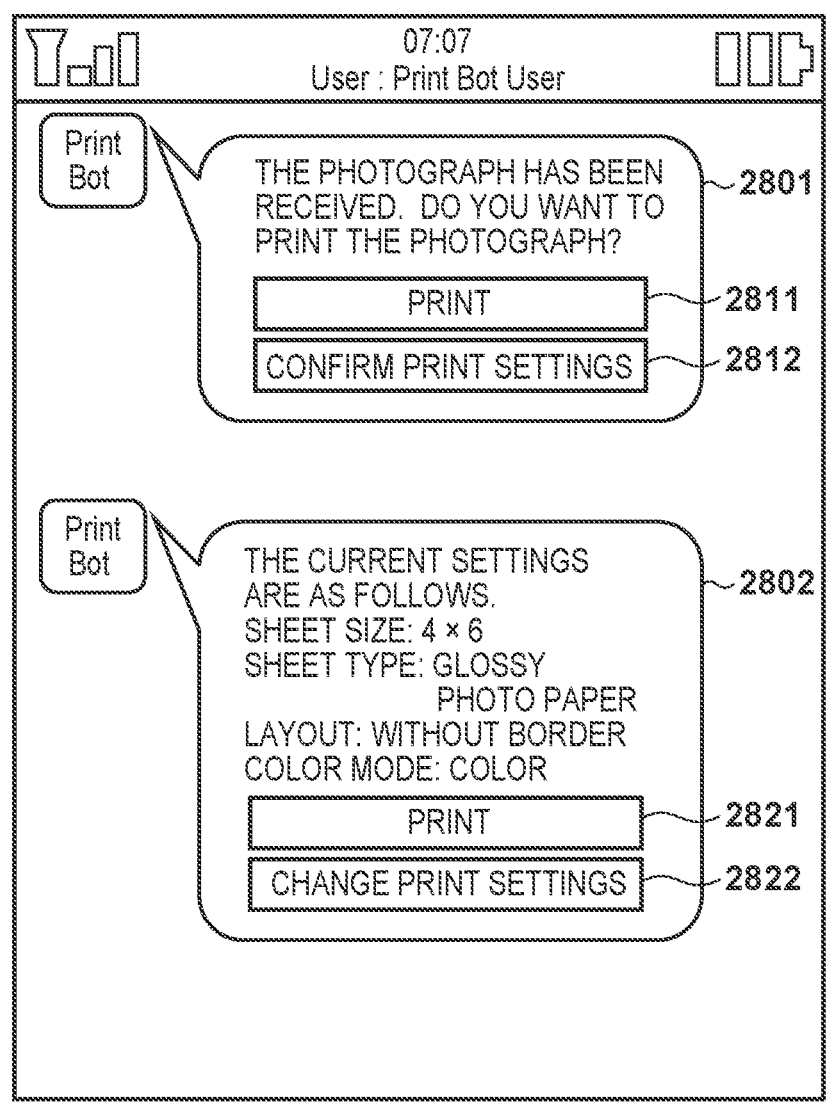
FIG. 28 is a view showing a message conversation screen which is displayed by client application according to the fourth embodiment.

FIG. 28 shows an example of a screen in which a button for confirming the print setting has been provided in each image reception response message according to this embodiment. A message 2801 is an image reception response message displayed as a response when an image file (not shown) is received as described above. A button 2811 shown here is the same as a button 1704 shown in FIG. 17A and is a button for transmitting a print instruction to a bot application 310. When the user presses a button 2812, the print setting information in the print request information corresponding to the image file is transmitted as a response message.

A message 2802 is a print setting message received by a client application 110 as a response from the bot application 310 and is a message displayed when the button 2812 is pressed. The print setting information of the print request information corresponding to the current image file is included and displayed in the message 2802. A button 2821 and a button 2822 provided in the message 2802 are buttons for performing the same operations as those of the button 1704 and a button 1705 shown in FIG. 17A, respectively.

Note that although four print setting items are displayed in the example of FIG. 28, the displayed items may be increased/decreased in accordance with the number of the setting items. In addition, the information of the printer which is to perform the printing may also be displayed with the setting items.

[Processing Sequence]

FIG. 29 is a sequence chart showing the processing performed in response to the user pressing the button 2812, in the state in which the message 2801 of FIG. 28 is displayed, until the message 2802 will be displayed.

In S2901, the client application 110 accepts that the user has pressed the button 2812 on the conversation screen.

In S2902, in response to the pressing of the button 2812, the client application 110 transmits a print setting confirmation message to a messaging service application 220 of a messaging application server 200.

In S2903, upon receiving the print setting confirmation message, the messaging service application 220 transmits a print setting confirmation message notification to the bot application 310 of a bot application server 300.

In S2904, upon receiving the print setting confirmation message notification, the bot application 310 obtains the print setting information of the corresponding print request information from a database 330 and generates a print setting message based on this information.

In S2905, the bot application 310 transmits the print setting message transmission request generated in S2904 to the messaging service application 220.

In S2906, the messaging service application 220 transmits a print setting message to the target client application 110 based on the received print setting message transmission request. A client terminal 100 will display a print setting message in the manner of the message 2802 shown in FIG. 28 based on this print setting message. Subsequently, the processing sequence ends.

As described above, according to this embodiment, the user can easily confirm the current print setting information of an image file without activating a Web browser 120.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-026403, filed Feb. 16, 2018, and No. 2018-026404, filed Feb. 16, 2018, which are hereby incorporated by reference herein in their entirety.

What is claimed is:

1. A system formed by including a client terminal that includes a messaging application, a server, and a printing apparatus,
the client terminal including:
one or more processors; and
one or more memories storing instructions that, when executed by the one or more processors of the client terminal, cause the client terminal to:
transmit printing target data via a messaging screen provided by the messaging application;
display a message regarding a printing setting in the messaging screen;
display a setting screen different from the messaging screen based on a user operation for the message, wherein a URL (Uniform Resource Locator) corresponding to the setting screen is displayed in the setting screen; and
transmit printing setting information set via the setting screen,
the server including:
one or more processors; and
one or more memories storing instructions that, when executed by the one or more processors of the server, cause the server to:
provide a setting screen different from the messaging screen to the client terminal based on the user operation for the message, and
the printing apparatus including:
one or more processors; and
one or more memories storing instructions that, when executed by the one or more processors of the printing apparatus, cause the printing apparatus to:
execute printing processing based on a printing job based on the printing target data and the printing setting information.

2. The system according to claim 1, wherein the setting screen is provided by a Web browser.

3. The system according to claim 1, wherein, in a case where the setting screen is provided for printing second printing target data after first printing setting information is changed to second printing setting information in the setting screen for printing first printing target data, the second printing setting information is displayed as an initial value in the setting screen for printing the second printing target data.

4. The system according to claim 1, wherein the printing target data transmitted from the client terminal is printed by the printing apparatus by the client terminal transmitting identification information displayed on the printing apparatus.

5. The system according to claim 1, wherein setting items for setting a sheet size and a sheet type are included on the setting screen.

6. The system according to claim 1, wherein a printing complete message is displayed on the messaging screen upon completion of the printing processing.

7. The system according to claim 1, wherein the printing apparatus executes the printing processing using ink.

8. A system formed by including a server system and a printing apparatus,
the server system including:
one or more processors; and
one or more memories storing instructions that, when executed by the one or more processors of the server system, cause the server system to:
transmit a message regarding a printing setting in a messaging screen provided by messaging application of a client terminal capable of communicating with the server system; and
provide a setting screen different from the messaging screen based on an user operation for the message, wherein the setting screen is displayed by the client terminal, and a URL (Uniform Resource Locator) corresponding to the setting screen is displayed on the setting screen,
the printing apparatus including:

one or more processors; and
one or more memories storing instructions that, when executed by the one or more processors of the printing apparatus, cause the printing apparatus to:
execute printing processing based on a printing job based on the printing target data and the printing setting information.

9. The system according to claim 8, wherein the setting screen is provided by a Web browser.

10. The system according to claim 8, wherein in a case where the setting screen is provided to print second printing target data after first printing setting information is changed to second printing setting information in the setting screen to print first printing target data, the second printing setting information is displayed in the setting screen to print the second printing target data as an initial value.

11. The system according to claim 8, wherein the printing target data transmitted from the client terminal is printed by the printing apparatus by the client terminal transmitting identification information displayed on the printing apparatus.

12. The system according to claim 8, wherein setting items for setting a sheet size and a sheet type are included on the setting screen.

13. The system according to claim 8, wherein a printing complete message is displayed on the messaging screen upon completion of the printing processing.

14. The system according to claim 8, wherein the printing apparatus executes the printing processing using ink.

15. An information processing apparatus that is provided with messaging software that communicates with a messaging service via a network and executes transmitting and receiving of at least one message to and from the messaging service, and provides a message screen that includes at least a chat area in which the at least one message is displayed, the information processing apparatus comprising:
one or more processors; and
one or more memories storing instructions that, when executed by the one or more processors of the information processing apparatus, cause the information processing apparatus to:
display, in the chat area included in the message screen, an instruction area for receiving an instruction for displaying a print setting screen that enables a user to perform print setting to be used for printing a file, wherein the print setting screen is different from the message screen and the performed print setting is used to print a file represented by an image displayed in the chat area; and
in a case where a user performs an operation for executing printing, a message indicating completion of printing is received in response to the printer printing the transmitted content, and the message indicating the completion of printing is displayed in the chat area of the message screen, and
based on receiving the instruction on the instruction area, display the print setting screen, wherein a URL indicating a data provider of the print setting screen and an area for receiving, from a user, a selection of a type of print medium, are displayed on the print setting screen.

16. The apparatus according to claim 15, wherein the selection of a type of print medium includes a selection of a paper type and not a selection of a paper size.

17. The apparatus according to claim 15, wherein a type of a print medium includes at least a type indicating a photo paper.

18. The apparatus according to claim 15, wherein the message screen includes the chat area and an area representing at least an user name for the messaging application.

19. The apparatus according to claim 15, wherein in a case where the information processing apparatus receives an operation for transitioning to the print setting screen, a display state of the message screen displayed by the messaging application is switched to a display state of the print setting screen displayed by a Web browser function.

20. The apparatus according to claim 15, wherein an initial print setting value is set in the print setting screen.

21. An information processing apparatus provided with messaging software that communicates with a messaging service via a network and executes transmitting and receiving of at least one message to and from the messaging service, and provides a message screen that includes at least a chat area in which the at least one message is displayed, the information processing apparatus comprising:
one or more processors; and
one or more memories storing instructions that, when executed by the one or more processors of the information processing apparatus, cause the information processing apparatus to:
display, in the chat area included in the message screen, an instruction area for receiving an instruction for displaying a print setting screen that enables a user to perform print setting to be used for printing a file, wherein the print setting screen is different from the message screen and the performed print setting is used to print a file represented by an image displayed in the chat area; and
based on receiving the instruction on the instruction area, display the print setting screen, wherein a URL indicating a data provider of the print setting screen and an area for receiving, from a user, a selection of a type of print medium, are displayed on the print setting screen.

22. The apparatus according to claim 21, wherein the selection of a type of print medium includes a selection of a paper type and not a selection of a paper size.

23. The apparatus according to claim 21, wherein a type of a print medium includes at least a type indicating a photo paper.

24. The apparatus according to claim 21, wherein the message screen includes the chat area and an area representing at least an user name for the messaging application.

25. The apparatus according to claim 21, wherein in a case where the reception unit receives an operation for transitioning to the print setting screen, a display state of the message screen displayed by the messaging application is switched to a display state of the print setting screen displayed by a Web browser function.

26. The apparatus according to claim 21, wherein an initial print setting value is set in the print setting screen.

27. A non-transitory computer-readable storage medium storing instructions that, when executed by a processor, provide a messaging application that includes a message screen including a chat area, the instructions causing the messaging application to perform:
receiving a transmission instruction of a file in the message screen from a user;
displaying, in the chat area, an image in the file of the transmission instruction, and an instruction area for displaying a print setting screen for performing print setting used for printing the image; and
receiving an operation for the instruction area from a user, wherein in response to an operation for the instruction area being received, a print setting screen different from the message screen is displayed, and
a URL indicating a data provider of the print setting screen and an area for receiving, from a user, a selection of a type of print medium, are included in the print setting screen.

28. The non-transitory computer-readable storage medium according to claim 27, wherein the selection of a type of print medium is a selection of a paper type and not a selection of a paper size.

29. The non-transitory computer-readable storage medium according to claim 27, wherein a type of a print medium includes at least photo paper.

30. The non-transitory computer-readable storage medium according to claim 27, wherein the message screen includes the chat area and an area representing at least a user name for the messaging application.

31. The non-transitory computer-readable storage medium according to claim 27, wherein in a case where an operation for transitioning to the print setting screen is received, a display state of the message screen displayed by the messaging application is switched to a display state of the print setting screen displayed by a Web browsing function.

32. The non-transitory computer-readable storage medium according to claim 27, wherein an initial print setting value is set in the print setting screen.

33. The non-transitory computer-readable storage medium according to claim 27, wherein the instruction to the instruction area is a pressing of a print setting button.

34. A non-transitory computer-readable storage medium storing instructions that, when executed by a processor, cause a messaging application that includes a message screen including a chat area, to perform:
displaying, in the chat area included in the message screen, an instruction area for receiving an instruction for displaying a print setting screen that enables a user to perform print setting to be used for printing a file, wherein the print setting screen is different from the message screen and the performed print setting is used to print a file represented by an image displayed in the chat area; and
based on receiving the instruction on the instruction area, displaying the print setting screen, wherein a URL indicating a data provider of the print setting screen and an area for receiving, from a user, a selection of a type of print medium, are displayed on the print setting screen.

35. The non-transitory computer-readable storage medium according to claim 34, wherein the selection of a type of print medium is a selection of a paper type and not a selection of a paper size.

36. The non-transitory computer-readable storage medium according to claim 34, wherein a type of a print medium includes at least photo paper.

37. The non-transitory computer-readable storage medium according to claim 34, wherein the message screen includes the chat area and an area representing at least an user name for the messaging application.

38. The non-transitory computer-readable storage medium according to claim 34, wherein in a case where an operation for transitioning to the print setting screen is received, a display state of the message screen displayed by the messaging application is switched to a display state of the print setting screen displayed by a Web browsing function.

39. The non-transitory computer-readable storage medium according to claim 34, wherein an initial print setting value is set in the print setting screen.

40. The non-transitory computer-readable storage medium according to claim 34, wherein the instruction to the instruction area is a pressing of a print setting button.

41. A non-transitory computer-readable storage medium storing a program for causing a computer of an information processing apparatus provided with a messaging application that communicates with a messaging service via a network and which executes transmitting and receiving at least one message to and from the messaging service and provides a message screen that includes at least a chat area in which the at least one message is displayed, to perform:
communicating with the messaging service and displaying the at least one message on the chat area; and
receiving an operation for transitioning to a print setting screen in the chat area where an image representing a content to be printed is also displayed in response to the content being transmitted to the messaging service, wherein
in response to receiving an operation to execute printing from a user, a message indicating completion of printing is received in response to the printer printing the transmitted content, and the message indicating the completion of printing is displayed in the chat area of the message screen, and
in a case where an operation for transitioning to the print setting screen is received from a user, the print setting screen including at least a print setting area different from the chat area is displayed, and a print setting for selecting at least a type of print medium in the print setting area, in which a URL indicating a data provider of the print setting screen is displayed, is received.

42. A non-transitory computer-readable storage medium storing a program for causing a computer of an information processing apparatus that is provided with a messaging application that communicates with a messaging service via a network and which executes transmitting and receiving at least one message to and from the messaging service, and provides a message screen that includes at least a chat area in which the at least one message is displayed, to perform:
communicating with a messaging service and displaying the at least one message on the chat area; and
receiving an operation for transitioning to a print setting screen in the chat area where an image representing content to be printed is also displayed in response to the content being transmitted to the messaging service,
wherein in response to receiving an operation for transitioning to the print setting screen, the print setting screen including at least a print setting area different from the chat area is displayed, and a print setting for selecting at least a type of print medium in the print setting area, in which a URL indicating a data provider of the print setting screen is displayed, is received.

43. An information processing apparatus provided with a messaging application that communicates with a messaging service via a network and which executes transmitting and receiving of at least one message to and from the messaging service, and provides a message screen that includes at least a chat area in which the at least one message is displayed, the information processing apparatus comprising:
one or more memories storing instructions; and
one or more processors that, upon executing the stored instructions, function as:

a first reception unit configured to receive a transmission instruction of a file in the message screen from a user;

a displaying unit configured to display an image in the file and an instruction area for displaying a print setting screen for performing print setting used for printing the image in the chat area; and a second reception unit for receiving an operation for the instruction area from a user, wherein in response to an operation for the instruction area being received from a user by the second reception unit, a print setting screen different from the message screen is displayed, and wherein a URL indicating a data provider of the print setting screen and an area for receiving, from a user, a selection of a type of print medium, are included in the print setting screen.

44. An information processing apparatus provided with a messaging application that communicates with a messaging service via a network and which executes transmitting and receiving at least one message to and from the messaging service, and provides a message screen that includes at least a chat area in which the at least one message is displayed, the information processing apparatus comprising:

one or more memories storing instructions; and one or more processors that, upon executing the stored instructions, function as:

a display unit configured to display an instruction area for displaying information of a file and a print setting screen for performing print setting used for printing the file in the chat area; and a reception unit configured to receive an instruction to the instruction area from a user, wherein in response to an instruction to the instruction area being received by the reception unit, a print setting screen different from the message screen is displayed by the messaging application, and wherein a URL indicating a data provider of the print setting screen and an area for receiving, from a user, a selection of a type of print medium, are displayed on the print setting screen.

45. A system comprising a first server providing messaging service via a network, an information processing apparatus provided with a messaging application that communicates with the first server and executes transmitting and receiving at least one message to and from the messaging service, and provides a message screen that includes at least a chat area in which the at least one message is displayed, and a second server cooperating with the messaging application, wherein, in response to receiving content to be printed which are transmitted via the messaging application, the first server transmits the content to the second server, wherein, in response to receiving the content from the first server, the second server generates a print request for the content and transmits the print request to a printer in a case where the second server receives a print instruction from a user, wherein the information processing apparatus comprises a reception unit configured to receive an operation for transitioning to a print setting screen in the chat area where, in addition to the at least one message being displayed, an image representing contents to be printed is also displayed in response to the content being transmitted to the messaging service, and in a case where a user performs an operation for executing printing, a message indicating a completion of printing is received in response to the printer printing the transmitted content, and the message indicating the completion of printing is displayed in the chat area of the message screen, in a case where the reception unit receives from a user the operation for transitioning to the print setting screen, the print setting screen including at least a print setting area different from the chat area is displayed, and a print setting for selecting at least a type of print medium is received in the print setting area in which a URL indicating a data provider of the print setting screen is displayed.

46. A system comprising a first server providing messaging service via a network, an information processing apparatus that is provided with a messaging application that communicates with the first server and executes transmitting and receiving of at least one message to and from the messaging service, the messaging application providing a message screen that includes at least a chat area in which the at least one message is displayed, and a second server cooperating with the messaging application, wherein, in response to receiving content to be printed which are transmitted via the messaging application, the first server transmits the content to the second server, wherein, in response to receiving the content from the first server, the second server generates a print request for the content and transmits the print request to a printer in a case where the second server receives a print instruction from a user, wherein the information processing apparatus comprises a reception unit configured to receive an operation for transitioning to a print setting screen in the chat area where, in addition the at least one message being displayed, an image representing content to be printed is also displayed in response to the content being transmitted to the messaging service, and in response to receiving the operation for transitioning to a print setting screen, the print setting screen including at least a print setting area different from the chat area is displayed, and a print setting for selecting at least a type of print medium is received in the print setting area in which a URL indicating a data provider of the print setting screen is displayed.

47. A system comprising a first server providing messaging service via a network, an information processing apparatus that is provided with a messaging application that communicates with the first server and executes sending and receiving of at least one message to and from the messaging service, and provides a message screen that includes at least a chat area in which the at least one message is displayed, and a second server cooperating with the messaging application, wherein, in response to receiving content to be printed which are transmitted via the messaging application, the first server transmits the content to the second server, wherein, in response to receiving the content from the first server, the second server generates print request for the content and transmits the print request to a printer in a case where the second server receives a print instruction from a user, wherein the information processing apparatus comprises:

first reception unit configured to receive a transmission instruction of a file in the message screen from a user;
displaying unit configured to display an image in the file, and an instruction area for displaying a print setting screen for performing print setting used for printing the image in the chat area; and
second reception unit for receiving an operation for the instruction area from a user,
wherein in response to an operation for the instruction area being received by the second reception unit, the print setting screen different from the message screen is displayed, and
a URL indicating a data provider of the print setting screen and an area for receiving, from a user, a selection of a type of print medium, are included in the print setting screen.

48. A system comprising a first server providing messaging service via a network, an information processing apparatus that is provided with a messaging application that communicates with the first server and executes transmitting and receiving at least one message to and from the messaging service, and provides a message screen that includes at least a chat area in which the at least one message is displayed, and a second server cooperating with the messaging application,
wherein
in response to receiving content to be printed which is transmitted via the messaging application, the first server transmits the content to the second server,
in response to receiving the content from the first server, the second server generates a print request for the content and transmits the print request to a printer in a case where the second server receives a print instruction from a user,
the information processing apparatus comprises:
display unit configured to display an instruction area for displaying information of a file and a print setting screen for performing print setting used for printing the file in the chat area; and
reception unit configured to receive an instruction to the instruction area from a user,
in response to an instruction to the instruction area being received by the reception unit, a print setting screen different from the message screen is displayed by the messaging application, and
a URL indicating a data provider of the print setting screen and an area for receiving, from a user, a selection of a type of print medium, are displayed on the print setting screen.

* * * * *